(12) United States Patent
Yamada

(10) Patent No.: US 11,163,170 B2
(45) Date of Patent: Nov. 2, 2021

(54) IMAGE DISPLAY SYSTEM

(71) Applicant: FUJIFILM Corporation, Tokyo (JP)

(72) Inventor: Naoyoshi Yamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 253 days.

(21) Appl. No.: 16/571,783

(22) Filed: Sep. 16, 2019

(65) Prior Publication Data

US 2020/0012115 A1   Jan. 9, 2020

Related U.S. Application Data

(63) Continuation of application No. PCT/JP2018/010336, filed on Mar. 15, 2018.

(30) Foreign Application Priority Data

Mar. 17, 2017  (JP) .............................. JP2017-052995

(51) Int. Cl.
  *G02B 27/14*  (2006.01)
  *G02B 27/28*  (2006.01)
  *G02B 30/25*  (2020.01)

(52) U.S. Cl.
  CPC ......... *G02B 27/144* (2013.01); *G02B 27/286* (2013.01); *G02B 30/25* (2020.01)

(58) Field of Classification Search
  CPC .. G02B 5/3083; G02B 27/286; G02B 5/3025; G02B 1/04; G02B 30/25; G02B 1/08; G02B 27/28; G02B 5/3016; G02B 5/3058; G02B 27/281; G02B 5/3041; G02B 1/02; G02B 5/1809; G02B 5/3075;
  (Continued)

(56) References Cited

U.S. PATENT DOCUMENTS 5,949,583 A  9/1999 Rallison et al.
2015/0248014 A1  9/2015 Powell et al.

FOREIGN PATENT DOCUMENTS

JP  09-90312 A  4/1997
JP  09-508477 A  8/1997
(Continued)

OTHER PUBLICATIONS

International Search Report issued in PCT/JP2018/010336 dated Jun. 19, 2018.
(Continued)

*Primary Examiner* — Collin X Beatty
*Assistant Examiner* — Grant A Gagnon
(74) *Attorney, Agent, or Firm* — Edwards Neils LLC; Jean C. Edwards, Esq.

(57) ABSTRACT

An image display system includes a first image display unit that has a first image display surface for displaying a first image and emits first emission light as first polarized light, a beam splitter that has a transflective surface for transmitting a part of incident light and reflecting another part of the incident light, the transflective surface being arranged at a position where the first emission light emitted from the first image display unit is incident, and the beam splitter changing the polarized light of the first emission light and reflecting the first emission light, and an absorption polarizer that is arranged at a position where reflected light reflected from the transflective surface of the beam splitter out of the first emission light is incident, to absorb the first polarized light and transmit second polarized light different from the first polarized light.

21 Claims, 20 Drawing Sheets

(58) Field of Classification Search
CPC ........ G02B 21/0092; G02B 5/30; G02B 1/06;
G02B 1/115; G02B 1/14; G02B 26/105;
G02B 27/283; G02B 27/288; G02B
27/48; G02B 30/27; G02B 5/00; G02B
5/3033; G02B 5/3066; G02B 5/32; G02B
6/305; G02B 6/32; G02B 6/34; G02B
6/4208; G02B 6/4214; G02B 6/43; G02B
13/001; G02B 13/0045; G02B 13/143;
G02B 17/08; G02B 17/0892; G02B
19/0028; G02B 19/0033; G02B 1/041;
G02B 1/10; G02B 1/11; G02B 1/12;
G02B 2027/012; G02B 2027/0194; G02B
21/0016; G02B 21/0032; G02B 21/0056;
G02B 21/0068; G02B 21/14; G02B
2207/117; G02B 23/00; G02B 23/12;
G02B 26/001; G02B 26/008; G02B
27/0018; G02B 27/0025; G02B 27/0101;
G02B 27/0927; G02B 27/095; G02B
27/0977; G02B 27/0988; G02B 27/1006;
G02B 27/1033; G02B 27/108; G02B
27/141; G02B 27/285; G02B 27/642;
G02B 3/0056; G02B 5/003; G02B 5/008;
G02B 5/0252; G02B 5/0263; G02B
5/0278; G02B 5/04; G02B 5/18; G02B
5/201; G02B 5/28; G02B 5/284; G02B
5/285; G02B 5/287; G02B 5/288; G02B
5/3008; G02B 5/305; G02B 6/2713;
G02B 6/272; G02B 6/2726; G02B 6/276;
G02B 6/2766; G02B 6/4246; G02B
7/008; G02B 9/34
USPC .......................................................... 359/489
See application file for complete search history.

(56) References Cited

FOREIGN PATENT DOCUMENTS

| JP | 2001-264692 A | 9/2001 |
|---|---|---|
| JP | 3460671 B2 | 10/2003 |
| JP | 2011-076121 A | 4/2011 |
| JP | 2015-210379 A | 11/2015 |

OTHER PUBLICATIONS

Written Opinion issued in PCT/JP2018/010336 dated Jun. 19, 2018.
International Preliminary Report on Patentability completed by WIPO on Sep. 17, 2019 in connection with International Patent Application No. PCT/JP2018/010336.
Office Action, issued by the Japanese Patent Office dated Apr. 28, 2020, in connection with Japanese Patent Application No. 2019-506274.

IMAGE DISPLAY SYSTEM

CROSS-REFERENCE TO RELATED APPLICATIONS

This application is a continuation application of International Application No. PCT/JP2018/010336, filed Mar. 15, 2018, which was published under Article 21(2) in Japanese, and which claims priority under 35 U.S.C. § 119(a) to Japanese Patent Application No. 2017-052995, filed Mar. 17, 2017. The above applications are hereby expressly incorporated by reference, in their entirety, into the present application.

BACKGROUND OF THE INVENTION

1. Field of the Invention

The present invention relates to an image display system.

2. Description of the Related Art

In recent years, in an information display device or the like mounted in an automobile, the amount of information to be displayed increases, and it is difficult for a driver to identify information at first sight. Accordingly, in order to make information to be confirmed more conspicuous, it is desirable for a system that makes a display image to be confirmed float and be displayed in a superimposed manner above other display images.

In a theater, a concert hall, or the like, a system that displays two different images in a superimposed manner or a system that displays an image on a real object or a person in a superimposed manner is used for providing a visual trick effect or a stage effect.

As described above, as a system that displays two different images or an image and a real object in a superimposed manner, in general, Pepper's ghost is known.

FIG. 30 is a schematic view showing an image display system 10 using Pepper's ghost. The image display system 10 is a system in which a virtual image A that is viewed in a case where an image displayed on a first image display unit 220 is specularly reflected from a beam splitter 230 and a transmission image C that is viewed in a case where an image displayed on a second image display unit 250 is transmitted through the beam splitter 230 are viewed in a superimposed manner.

Similarly, as a system using Pepper's ghost, JP2015-210379A describes a method that displays an image on a real object in a superimposed manner using a half mirror.

As another system that displays two different images or an image and a real object in a superimposed manner, JP3460671B and JP2011-076121A describe a method using a transmissive display device and a method using a transmissive screen.

SUMMARY OF THE INVENTION

According to the above-described Pepper's ghost and the display method described in JP2015-210379A, since the first image display unit 220 is provided on a viewing side from the beam splitter 230, there is a problem in that an image displayed on the first image display unit 220 is directly viewed and disturbs watching of a superimposed image.

According to the method using the transmissive display device described in JP3460671B, there is a problem in that the transmittance of the transmissive display device is generally low, and brightness of a transmission image transmitted through the transmissive display device and displayed significantly decreases.

According to the method using the transmissive screen described in JP2011-076121A, there is a problem in that a projector that projects an image onto the transmissive screen is needed, the system increases in size, and an installation place is limited.

The invention has been accomplished in consideration of the above-described problem, and an object of the invention is to provide an image display system capable of displaying a high-brightness superimposed image with space saving without restraining a direct image disturbing watching of the superimposed image from being viewed.

A first image display system of the invention is an image display system comprising a first image display unit that has a first image display surface for displaying a first image and emits first emission light as first polarized light, a beam splitter that has a transflective surface for transmitting a part of incident light and reflecting another part of the incident light, the transflective surface being arranged at a position where the first emission light emitted from the first image display unit is incident, and the beam splitter changing the polarized light of the first emission light and reflecting the first emission light, and an absorption polarizer that is arranged at a position where reflected light reflected from the transflective surface of the beam splitter out of the first emission light is incident, to absorb the first polarized light and transmit second polarized light different from the first polarized light.

In the first image display system of the invention, it is preferable that an angle $\alpha_1$ between the first image display surface of the first image display unit and the transflective surface of the beam splitter satisfies the following expression.

$$0°<\alpha_1<90°$$

It is preferable that the first image display system of the invention further comprises a second image display unit that has a second image display surface for displaying a second image and emits second emission light, the second image display unit is arranged at a position where the second emission light is incident on the transflective surface of the beam splitter from a side opposite to a side on which the first emission light is incident, and at least a part of the second emission light is transmitted through the beam splitter and the absorption polarizer.

In the first image display system of the invention, in a case where the first image display system comprises the second image display unit, it is preferable that the second image display surface of the second image display unit is arranged at a position being viewed in a state superimposed with a virtual image to be formed at a position symmetrical to the first image display surface with respect to the transflective surface of the beam splitter.

In the first image display system of the invention, in a case where the first image display system comprises the second image display unit, it is preferable that the second image display surface of the second image display unit is positioned on a surface parallel to and different from the virtual image.

In the first image display system of the invention, in a case where the first image display system comprises the second image display unit, it is preferable that, in a case where an angle between the first image display surface of the first image display unit and the transflective surface of the beam splitter is $\alpha_1$, an angle between the first image display surface of the first image display unit and the second image display surface of the second image display unit is $2\alpha_1$.

In the first image display system of the invention, in a case where the first image display system comprises the second image display unit, it is preferable that the first image and the second image supplement information to each other.

In the first image display system of the invention, it is preferable that the beam splitter includes a half mirror.

In this case, it is preferable that the beam splitter further includes a polarization conversion element.

Here, as the polarization conversion element, a quarter-wave retardation plate is particularly preferably used.

A second image display system of the invention is an image display system comprising a first image display unit that has a first image display surface for displaying a first image and emits first emission light as first polarized light, a reflective polarizer that is arranged at a position where the first emission light emitted from the first image display unit is incident, to reflect the first polarized light, and a beam splitter that has a transflective surface for transmitting a part of incident light and reflecting another part of the incident light, the transflective surface being arranged at a position where the first emission light reflected from the reflective polarizer is incident, the beam splitter changing the polarized light of the first emission light and reflecting the first emission light. The reflective polarizer is arranged at a position where reflected light reflected from the reflective polarizer and further reflected from the beam splitter out of the first emission light is incident.

In the second image display system of the invention, it is preferable that an angle $\alpha_2$ between the first image display surface of the first image display unit and the reflective polarizer satisfies the following expression, and $$0°<\alpha_2<90°$$

an angle $\beta_2$ between the first image display surface and the transflective surface satisfies the following expression.

$$85°<\beta_2<95°$$

It is preferable that the second image display system of the invention further comprises a second image display unit that has a second image display surface for displaying a second image and emits second emission light, the second image display unit is arranged at a position where the second emission light is incident on the transflective surface of the beam splitter from a side opposite to a side on which the reflective polarizer is arranged, and at least a part of the second emission light is transmitted through the beam splitter and the reflective polarizer.

In the second image display system of the invention, in a case where the second image display system comprises the second image display unit, it is preferable that the second image display surface of the second image display unit is arranged at a position being viewed in a state superimposed with a virtual image of the first image display surface to be formed through the reflective polarizer and the transflective surface of the beam splitter.

In the second image display system of the invention, in a case where the second image display system comprises the second image display unit, it is preferable that the second image display surface of the second image display unit is positioned on a surface parallel to and different from the virtual image.

In the second image display system of the invention, in a case where the second image display system comprises the second image display unit, it is preferable that, in a case where an angle between the first image display surface of the first image display unit and the reflective polarizer is $\alpha_2$, an angle between the first image display surface of the first image display unit and the second image display surface of the second image display unit is $2\alpha_2$.

In the second image display system of the invention, in a case where the second image display system comprises the second image display unit, it is preferable that the first image and the second image supplement information to each other.

It is preferable that the second image display system of the invention further comprises an absorption polarizer that is arranged on a surface opposite to a surface, on which the first emission light is incident, of the reflective polarizer to absorb the first polarized light.

In the second image display system of the invention, it is preferable that the beam splitter includes a half mirror.

In this case, it is preferable that the beam splitter further includes a polarization conversion element.

Here, as the polarization conversion element, a quarter-wave retardation plate is particularly preferably used.

According to the invention, it is possible to provide an image display system capable of displaying a high-brightness superimposed image with space saving without restraining a direct image disturbing watching of the superimposed image from being viewed.

DESCRIPTION OF THE PREFERRED EMBODIMENTS

Figure 1:
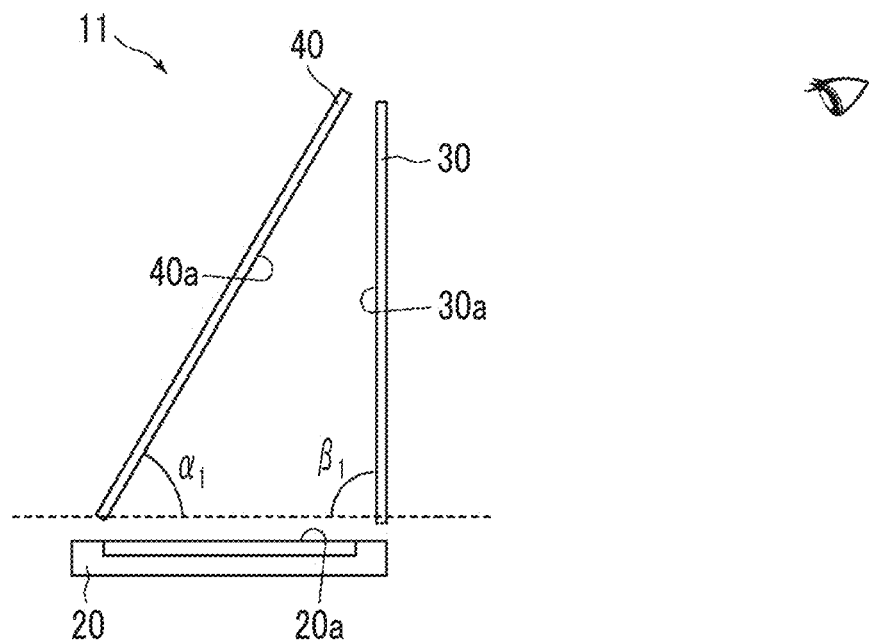
FIG. 1 is a schematic configuration diagram showing an embodiment of a first image display system of the invention.

Hereinafter, the invention will be described in detail referring to the drawings. The following description of constituent elements may be made based on a representative embodiment or a specific example, but the invention is not limited to such an embodiment.

[Form of First Image Display System of the Invention]

FIG. 1 is a diagram showing the schematic configuration of an embodiment of a first image display system of the invention. An image display system 11 comprises a first image display unit 20, an absorption polarizer 30, and a beam splitter 40.

The first image display unit 20 has a first image display surface 20a for displaying a first image and emits first emission light as first polarized light.

The beam splitter 40 has a transflective surface 40a for transmitting a part of incident light and reflecting another part of incident light, and the transflective surface 40a is arranged at a position where the first emission light emitted from the first image display unit 20 is incident. The beam splitter 40 has a function of changing the polarized light of the first emission light and reflecting the first emission light. Here, "changing the polarized light of the first emission light" means changing the first emission light as first polarized light to light including polarized light other than the first polarized light, and includes not only a case where the polarized light of the first emission light is changed to light including the second polarized light different from the first polarized light, but also a case where the polarized light of the first emission light is converted to polarized light having both components of the first polarized light and the second polarized light.

The absorption polarizer 30 absorbs the first polarized light and transmits the second polarized light different from the first polarized light, and is arranged at a position where reflected light from the transflective surface 40a of the beam splitter 40 out of the first emission light is incident.

With the above-described configuration, the image display system 11 allows a virtual image to be formed at a position symmetrical to the first image display surface 20a of the first image display unit 20 with respect to the transflective surface 40a of the beam splitter 40 to be viewed through the absorption polarizer 30. The virtual image to be formed is a virtual image of the first image to be displayed on the first image display surface 20a. In FIG. 1, a side on which an eye of a person schematically shown is an image viewing side (the same applies to the following drawings).

The principle of image display of the image display system 11 will be described referring to FIG. 2.

Figure 2:
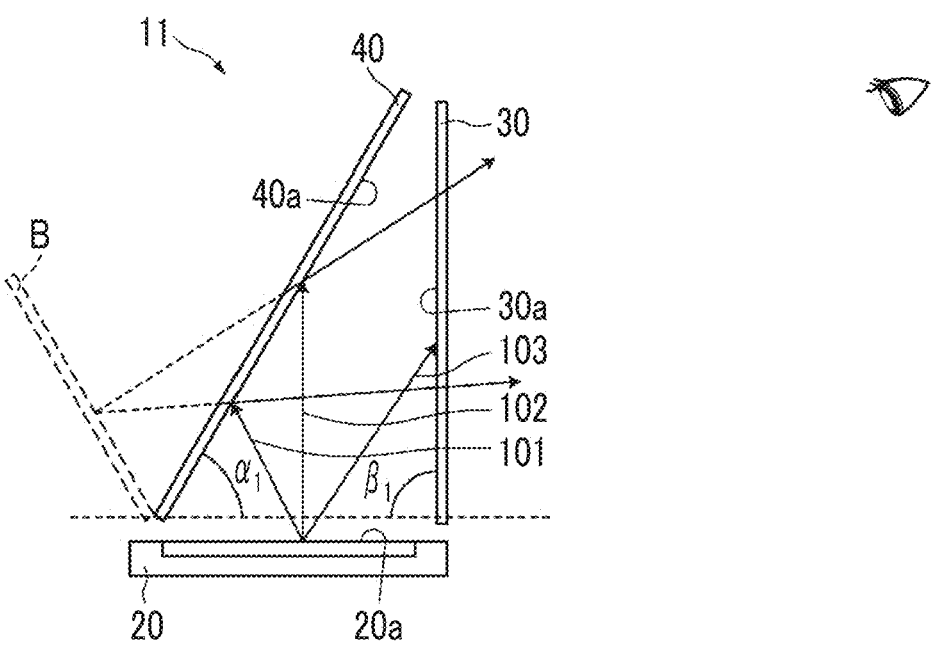
FIG. 2 is an explanatory view of the embodiment of the first image display system of the invention.

FIG. 2 shows light beams 101, 102 and 103 emitted from one point of the first image display surface 20a of the first image display unit 20 at different angles. The light beams 101 and 102 are incident on the transflective surface 40a of the beam splitter 40, and at least a part of the light beams 101 and 102 is reflected from the transflective surface 40a and forms a virtual image B at a position plane-symmetrical to the first image display surface 20a with respect to the transflective surface 40a. The optical paths of the light beams 101 and 102 are the same as the light beams emitted from the virtual image B, and reflected light reflected from the transflective surface 40a is incident on a surface 30a of the absorption polarizer 30. Here, since the light beams 101 and 102 become light including at least a part of polarized light other than the first polarized light with the operation of the beam splitter 40, at least a part of light is transmitted through the absorption polarizer 30. Accordingly, the virtual image B is visible.

The light beam 103 emitted from the first image display unit 20 is incident on the surface 30a of the absorption polarizer 30, and is absorbed by the absorption polarizer 30 that absorbs the first polarized light. That is, since light that is emitted from the first image display unit 20 and is directly incident on the absorption polarizer 30 is absorbed by the absorption polarizer 30, light is not transmitted to a viewer. Accordingly, the first image display surface 20a itself is not viewed by the viewer.

Figure 3:
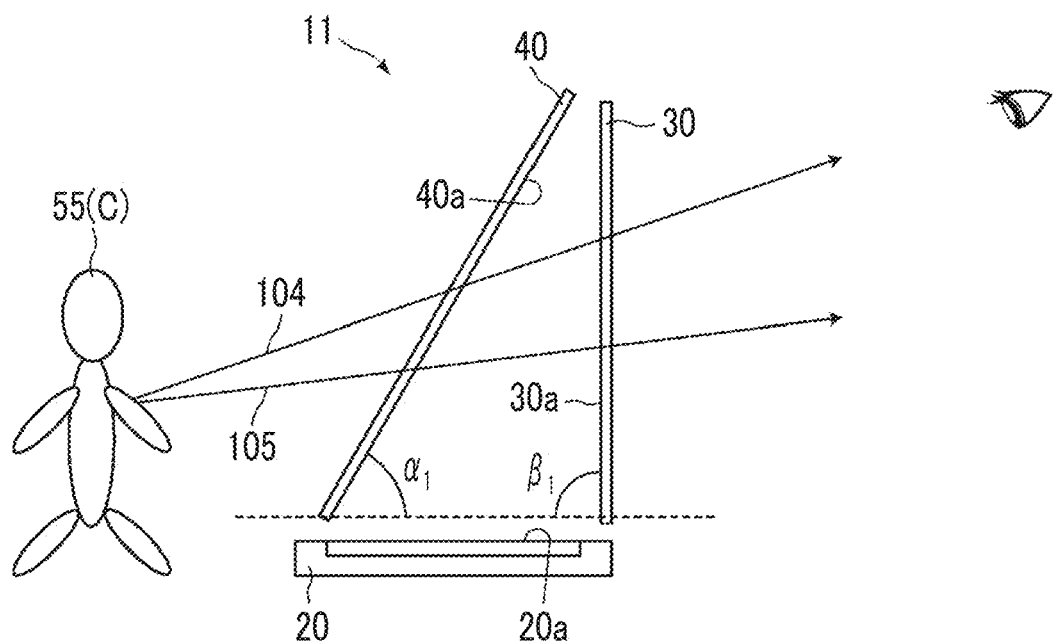
FIG. 3 is an explanatory view of the embodiment of the first image display system of the invention.

FIG. 3 shows a case where a real object 55 is provided on a side opposite to a viewing side of the beam splitter 40 in the image display system 11. At least a part of light beams 104 and 105 emitted from the real object 55 is transmitted through the beam splitter 40, then, is further transmitted through the absorption polarizer 30, and is emitted to the viewing side. Accordingly, an image of the real object 55 is visible as a transmission image C through the absorption polarizer 30 and the beam splitter 40.

Figure 4:
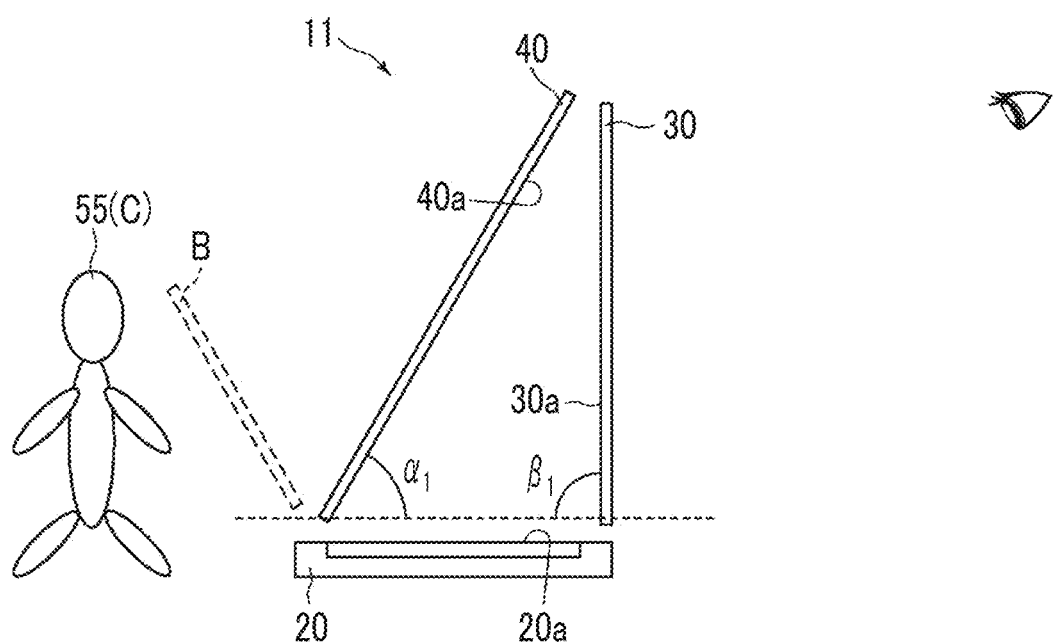
FIG. 4 is an explanatory view of the embodiment of the first image display system of the invention.

Accordingly, as shown in FIG. 4, in the image display system 11, the virtual image B and the transmission image C are viewed in a superimposed manner. A position where the real object 55 is provided is adjusted, whereby the virtual image B may be displayed in front of the transmission image C or the virtual image B may be displayed at the back of the transmission image C. The real object 55 may be a moving object or may make the transmission image C to be viewed through the virtual image B.

The real object 55 may be, for example, a person. In this case, as the virtual image B, a motion image adjusted to the motion of the person is displayed, whereby it is possible to increase a stage effect in a theater, a concert hall, or the like.

[Another Form of First Image Display System of the Invention]

Next, an embodiment of a case where a second image display unit is provided in the first image display system of the invention will be described. The same components as the components described above are represented by the same reference numerals, and detailed description thereof will not be repeated.

Figure 5:
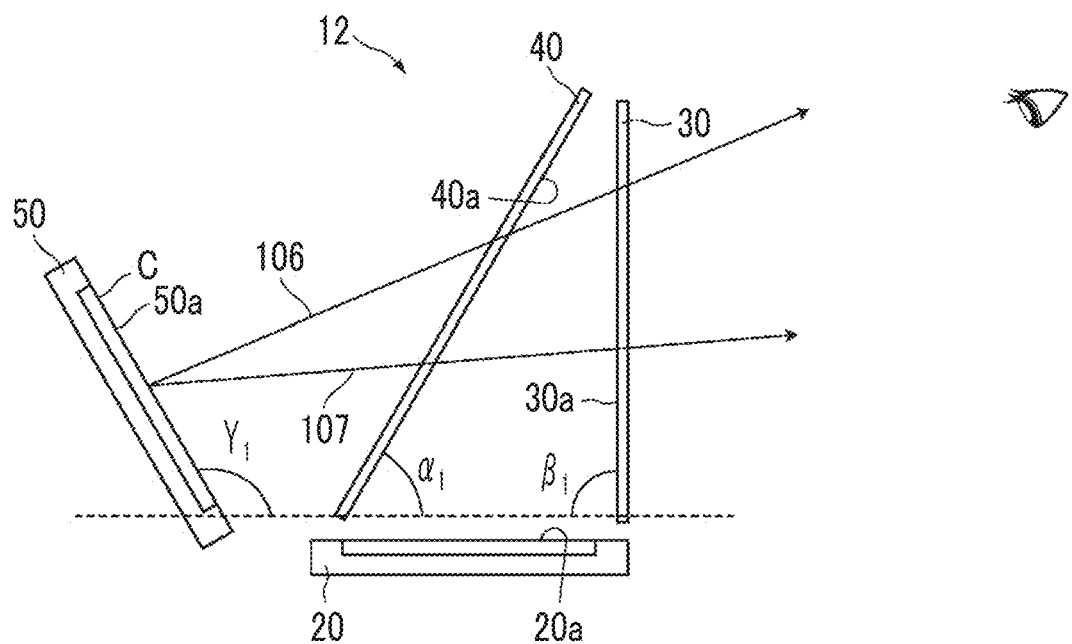
FIG. 5 is a schematic configuration diagram showing another embodiment of the first image display system of the invention.

An image display system 12 shown in FIG. 5 is common with the image display system 11 in that the image display system 12 comprises the first image display unit 20, the absorption polarizer 30, and the beam splitter 40. The image display system 12 further comprises a second image display unit 50 on a side opposite to the viewing side of the beam splitter 40.

The second image display unit 50 has a second image display surface 50*a* for displaying a second image and emits second emission light. The second image display unit 50 is arranged at a position where the second emission light is incident on the transflective surface 40*a* of the beam splitter 40 from a side opposite to a side on which the first emission light is incident.

As shown in FIG. 5, at least a part of the second emission light (light beams 106 and 107) emitted from the second image display unit 50 is transmitted through the beam splitter 40, then, is further transmitted through the absorption polarizer 30, and is emitted to the viewing side. With this, the second image displayed on the second image display unit 50 is visible as the transmission image C through the beam splitter 40 and the absorption polarizer 30. The second emission light includes polarized light different from the first polarized light at least in a case of being incident on the absorption polarizer 30 in order to be transmitted through the absorption polarizer 30.

At least a part of the light beam emitted from the first image display unit 20 passes through the same optical path as in a case described referring to FIG. 2, and the first image displayed on the first image display surface 20*a* of the first image display unit 20 is viewed as the virtual image B.

Figure 6:
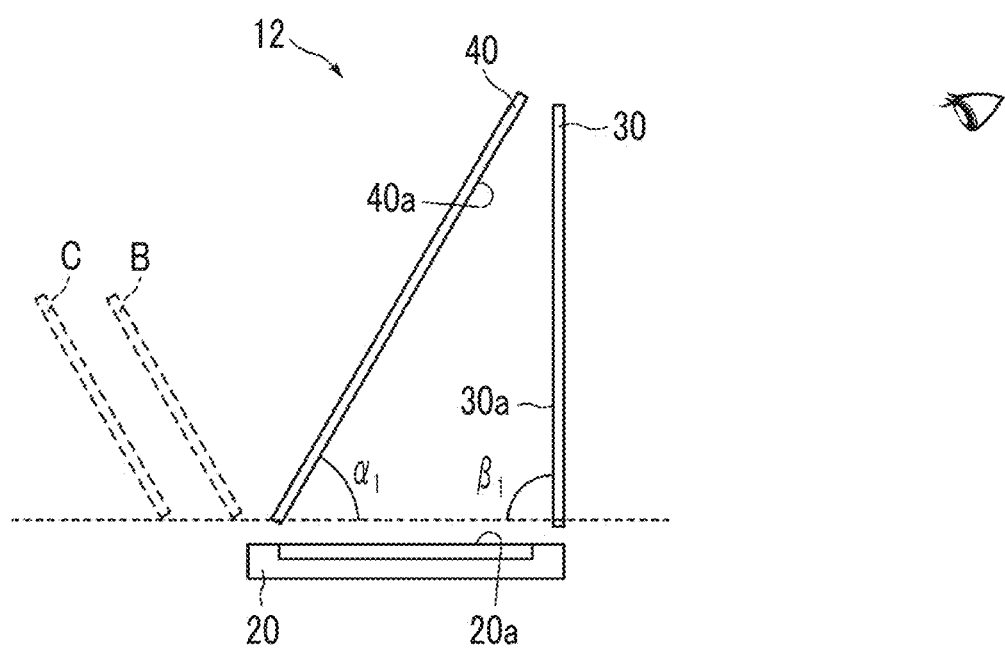
FIG. 6 is an explanatory view of another embodiment of the first image display system of the invention.

Here, the second image display surface 50*a* of the second image display unit 50 is arranged on a surface parallel to and different from the virtual image B to be formed at a position symmetrical to the first image display surface 20*a* with respect to the transflective surface 40*a* of the beam splitter 40. Accordingly, as shown in FIG. 6, the virtual image B and the transmission image C are viewed in a superimposed manner to the viewer. A position where the second image display unit 50 is provided is adjusted, whereby the virtual image B may be displayed in front of the transmission image C or may the transmission image C may be displayed in front of the virtual image B.

Figure 7:
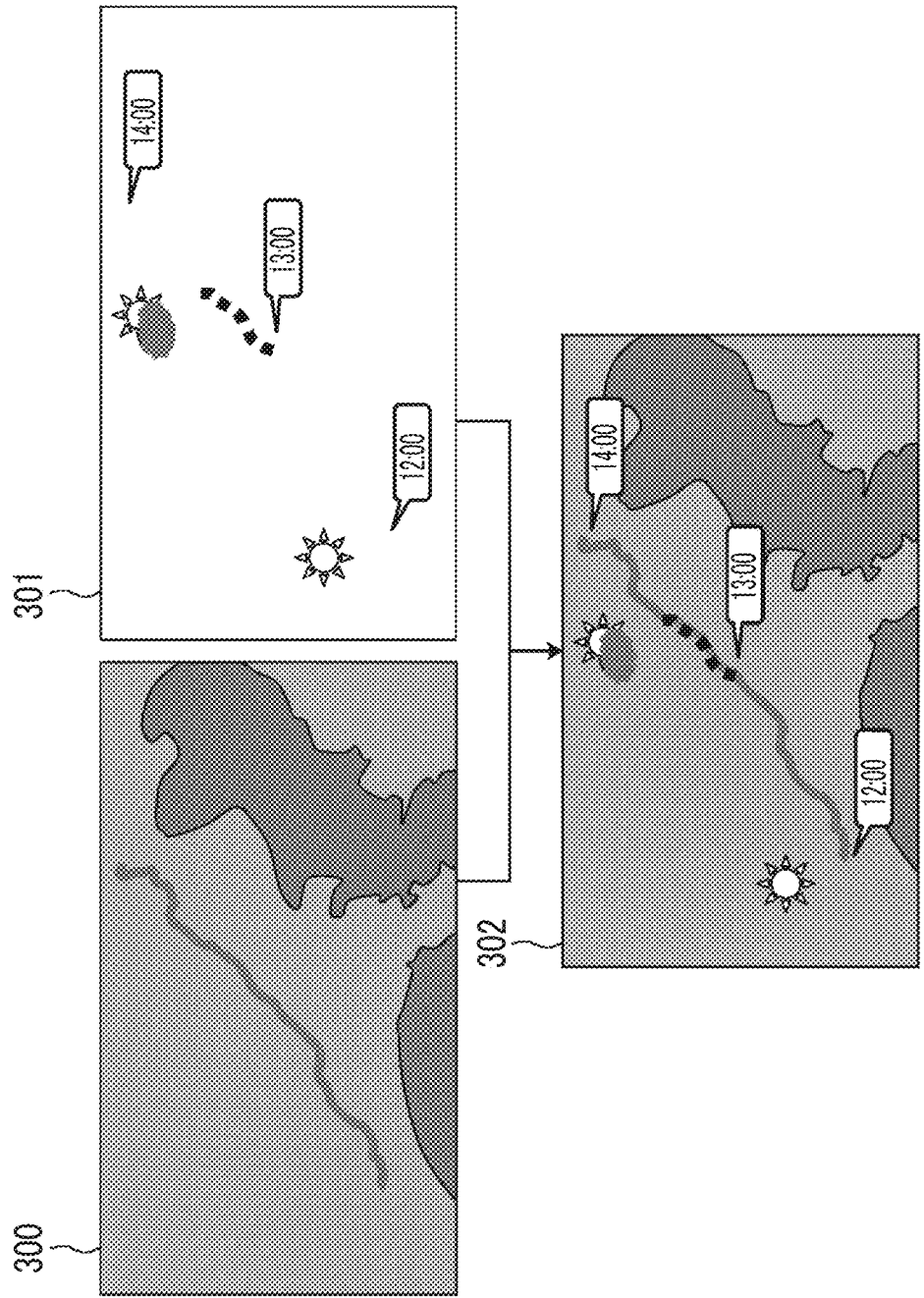
FIG. 7 shows an example of an image that is displayed by an image display system of an embodiment.

In the image display system 12, as shown in FIG. 7, a map image 300 is displayed as the transmission image C, and an additional image 301, such as navigation information, is displayed as the virtual image B, whereby it is possible to generate a superimposed image 302 in which the map image 300 and the additional image 301 are superimposed. In this case, the additional image 301 is viewed so as to be floated above the map image 300, and there is an advantage that the map image 300 and the additional image 301 are easily identified at first sight.

Details of the elements in the first image display system of the above-described embodiment will be described below.

[First Image Display Unit]

The first image display unit 20 is provided on a side opposite to a viewing side of the absorption polarizer 30. The first image display surface 20*a* may be a plane or may be a curved surface. In a case where the first image display surface 20*a* is a curved surface, the virtual image B also becomes curved, and the image can be made to be stereoscopically viewed or a stage effect in a theater or the like can be increased.

The first image display unit 20 emits the first polarized light as emission light. Means for displaying an image may be a still image, a photograph, or the like, or may be an image display device. As the image display device, a liquid crystal display device, an organic EL display device, or the like can be suitably used. Between the liquid crystal display device and the organic EL display device, a display device in which emission light becomes linearly polarized light is known, and the display device can be suitably used as the first image display unit 20. The first image display unit 20 may comprise an image display device that emits a still image, a photograph, or emission light as non-polarized light, and an absorption polarizer for emission light polarization adjustment that transmits the first polarized light and absorbs the second polarized light different from the first polarized light on an image display surface of the image display device. The still image, the photograph, or the second polarized light out of the light from the image display device is absorbed in the absorption polarizer for emission light polarization adjustment, and as a result, emission light as the first polarized light can be obtained.

The first polarized light may be linearly polarized light or may be circularly polarized light. In a case where the first polarized light is linearly polarized light, the second polarized light is linearly polarized light perpendicular to the first polarized light. In a case where the first polarized light is circularly polarized light, the second polarized light is circularly polarized light in an opposite direction to the first polarized light.

The first polarized light is emitted from the first image display unit 20, whereby a component incident on the absorption polarizer 30 that absorbs the first polarized light out of the light beam emitted from the first image display unit 20 is absorbed by the absorption polarizer 30. For this reason, it is possible to restrain the first image on the first image display surface 20*a* of the first image display unit 20 from being directly viewed.

Even in a case where the first image display unit 20 is configured of the image display device that emits the first polarized light, an absorption polarizer that absorbs the second polarized light may be provided on the image display surface. In this way, it is possible to restrain a region other than the first image display surface 20*a* of the first image display unit 20, that is, an image display region, from being directly viewed.

[Absorption Polarizer]

The absorption polarizer 30 is arranged on a viewing side from the first image display unit 20 and the beam splitter 40. The absorption polarizer 30 absorbs the first polarized light and transmits the second polarized light different from the first polarized light. Polarized light that is absorbed by the absorption polarizer 30 coincides with polarized light of emission light that is emitted from the first image display unit 20, whereby the first image displayed on the first image display surface 20*a* of the first image display unit 20 is not directly viewed.

In a case where the first polarized light is linearly polarized light, as the absorption polarizer 30, a linear polarizer that absorbs linearly polarized light can be used. In a case where the first polarized light is circularly polarized light, as the absorption polarizer 30, a circular polarizer that absorbs circularly polarized light can be used. The circular polarizer can be produced, for example, by laminating a quarter-wave retardation plate on the linear polarizer.

The absorption polarizer 30 may be arranged at a position where light reflected from the beam splitter 40 out of the first emission light emitted from the image display surface 20*a* of the first image display unit 20 is incident, and an optical path of the first emission light from the first image display unit 20 to the beam splitter 40 is disturbed. An angle $\beta_1$ between the image display surface 20a and the surface 30a of the absorption polarizer 30 is not limited.

It is preferable that anti-reflection treatment is applied to the surface of the absorption polarizer 30. As the anti-reflection treatment, laminating a thin film having a specific refractive index and a film thickness or laminating a moth-eye film is included in order to reduce reflectance of visible light. The anti-reflection treatment is applied, whereby it is possible to suppress unnecessary reflection on the surface of the absorption polarizer 30, and to suppress the occurrence of stray light causing deterioration of visibility of an image or reflection of external light.

[Beam Splitter]

The beam splitter 40 is a semi-transmissive optical member that specularly reflects a part of the first emission light and transmits another part of the first incident light. In order to obtain an image with no distortion, it is preferable that the transflective surface 40a of the beam splitter 40 is a plane.

The beam splitter 40 is provided on a side opposite to a viewing side of the absorption polarizer 30 and the first image display unit 20.

It is preferable that an angle $\alpha_1$ between the image display surface 20a of the first image display unit 20 and the transflective surface 40a of the beam splitter 40 satisfies the following expression.

$$0°<\alpha_1<90°$$

In a case where $\alpha_1$ is within the above-described range, it is preferable since the virtual image B is visible at an angle at which the virtual image B is easily viewed to the viewer. In a case where the first image display surface 20a is a curved surface, the angle between the first image display surface 20a and the transflective surface 40a described above is set to an angle between a tangent at a point to be the most convex portion of the first image display surface 20a and the transflective surface 40a.

The beam splitter 40 changes a polarization state of the first emission light and reflects the first emission light. The polarization state of the first emission light is changed, whereby it is possible to make at least a part of the first emission light reflected from the beam splitter 40 be transmitted through the absorption polarizer 30 and emitted to the viewing side.

In a case where the first polarized light is linearly polarized light, it is preferable that a reflective polarizer having a selective reflection property of circularly polarized light is used as the beam splitter 40. It is preferable since, in a case where linearly polarized light is incident, the reflective polarizer having the selective reflection property of circularly polarized light changes a part of incident light to circularly polarized light and reflects circularly polarized light.

It is preferable that a reflective polarizer having a selective reflection property of linearly polarized light is used as the beam splitter 40, and is provided such that an angle between a transmission axis of the absorption polarizer 30 and a transmission axis of the beam splitter 40 becomes about 45° in a case of being viewed from the viewing side.

It is also preferable that a half mirror, a polarization selective reflection member, or a wavelength selective reflection member with a polarization conversion element laminated on a surface thereof on the viewing side is used as the beam splitter 40. In this case, it is preferable since the polarization state of incident light can be changed and incident light can be reflected.

In a case where a wavelength selective reflection member is used as the beam splitter 40, it is preferable that the wavelength selective reflection member is designed so as to selectively reflect a wavelength range including a wavelength of the first emission light from the first image display unit 20. In this case, it is preferable since the reflectance of the first emission light can be increased, and the brightness of the virtual image B can be improved. In a case where the second image display unit 50 is provided on the side opposite to the viewing side of the beam splitter 40, it is preferable that the second image display unit 50 is designed so as to selectively transmit a wavelength range including a wavelength of the second emission light from the second image display unit 50. In this case, it is preferable since the transmittance of the second emission light can be increased, and the brightness of the transmission image C can be improved.

[Polarization Conversion Element]

In a case where the polarization conversion element is provided on the surface of the beam splitter 40, as the polarization conversion element, a depolarization element or a retardation plate can be used.

As the polarization conversion element, a quarter-wave retardation plate is preferably used. It is preferable that the quarter-wave retardation plate is provided such that an angle between a transmission axis of the absorption polarizer 30 and a slow axis of the quarter-wave retardation plate becomes about 45° in a case of being viewed from the viewing side.

The quarter-wave retardation plate may have a phase difference to be about ¼ wavelength in any wavelength of a visible range. For example, a retardation plate having a phase difference of about 138 nm in a wavelength of 550 nm can be suitably used. In order to reduce color unevenness of the virtual image B and the transmission image C, it is preferable that the quarter-wave retardation plate has reverse dispersibility to a wavelength. Here, the reverse dispersibility to the wavelength means that, as the wavelength increases, the value of the phase difference in the wavelength increases.

In a case where the second image display unit 50 is provided on the side opposite to the viewing side of the beam splitter 40, in order to increase the transmittance of the second emission light emitted from the second image display unit 50, a polarization conversion element may be provided on the side opposite to the viewing side of the beam splitter.

[Second Image Display Unit]

The second image display unit 50 is provided on the side opposite to the viewing side of the beam splitter 40. The second image display surface 50a of the second image display unit 50 may be a plane or may be a curved surface. The second image display unit 50 may be a still image, a photograph, or the like, or may be an image display device.

It is preferable that an image display device that emits polarized light is used as the second image display unit 50. In this case, a beam splitter having a polarization selective reflection member is used as the beam splitter 40, whereby it is possible to provide the second image display unit 50 such that most of the light beams emitted from the second image display unit 50 is transmitted through the beam splitter 40 and the absorption polarizer 30, and the brightness of the transmission image C can be increased. As the image display device, a liquid crystal display device, an organic EL display device, or the like can be suitably used.

Although an angle $\gamma_1$ between the second image display surface 50a of the second image display unit 50 and the first image display surface 20a of the first image display unit 20 can be optionally set, it is preferable that the angle $\gamma_1$ is set such that the virtual image B and the transmission image C are parallel to each other.

$$\gamma_1 = 2\alpha_1$$

The first image display unit 20, the second image display unit 50, and the beam splitter 40 are provided such that the above-described expression is satisfied. With this, the virtual image B and the transmission image C can be made parallel to each other.

[Example of Preferred Embodiment]

A preferred embodiment of the first image display system of the invention will be described in more detail referring to FIGS. 8 to 10.

Figure 8:
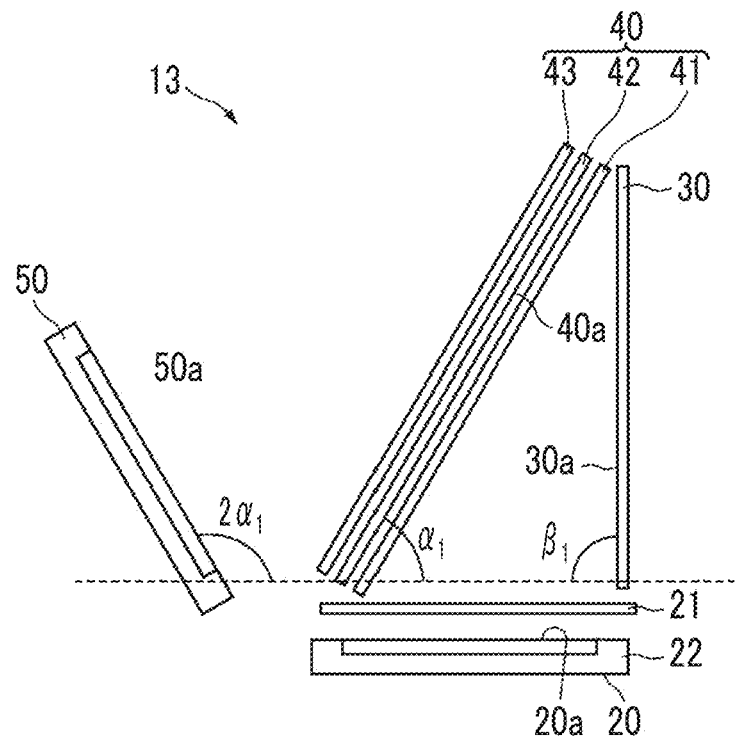
FIG. 8 is a schematic configuration diagram showing a preferred embodiment of the first image display system of the invention.

FIG. 8 shows a preferred embodiment of the first image display system of the invention. An image display system 13 comprises the first image display unit 20, the absorption polarizer 30, and the beam splitter 40 on different surfaces. The absorption polarizer 30 and the beam splitter 40 are provided in this order from the viewing side. In addition, the image display system 13 comprises the second image display unit 50 on the side opposite to the viewing side of the beam splitter 40.

An angle between the first image display surface 20a of the first image display unit 20 and the transflective surface 40a of the beam splitter 40 is $\alpha_1$. For example, $\alpha_1$ is 60°.

The first image display unit 20 is a liquid crystal display device that emits linearly polarized light (first polarized light). In addition, an absorption polarizer 21 is provided on the first image display surface 20a of the first image display unit 20. The absorption polarizer 21 is provided in a direction to transmit emission light from the first image display unit 20.

The beam splitter 40 has a quarter-wave retardation plate 41, a half mirror 42, and a quarter-wave retardation plate 43 laminated in this order from the viewing side, and is provided such that, in a case of being viewed from the viewing side, an angle between a transmission axis of the absorption polarizer 30 and a slow axis of the quarter-wave retardation plate 41 becomes 45°, and an angle between the slow axis of the quarter-wave retardation plate 41 and a slow axis of the quarter-wave retardation plate 43 becomes 90°.

Figure 9:
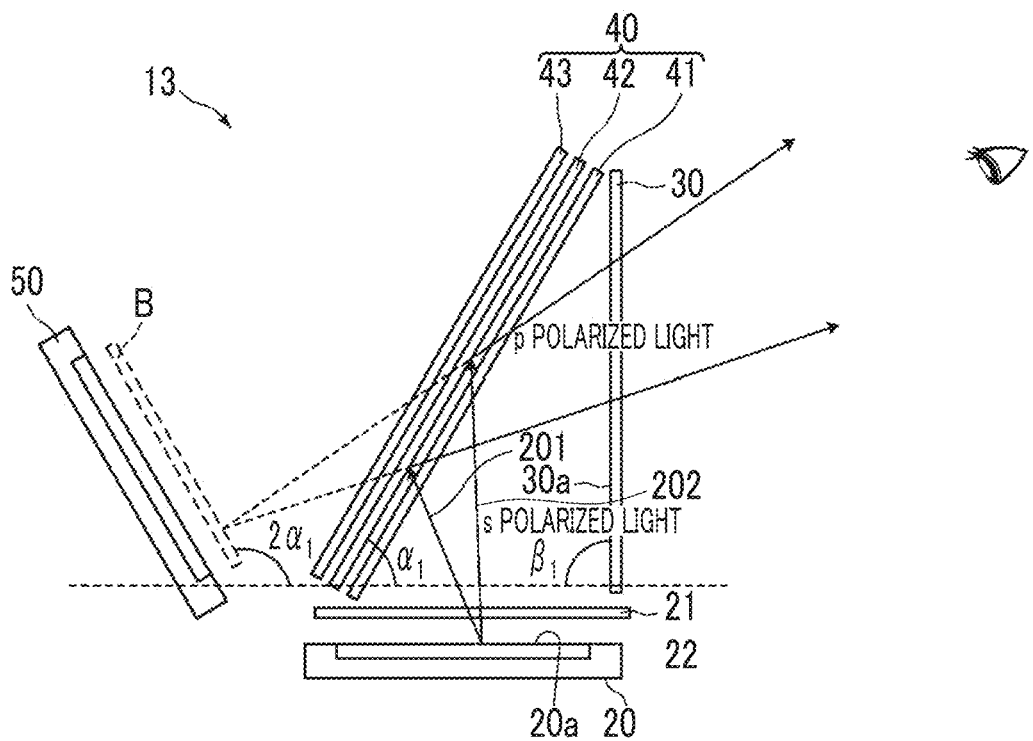
FIG. 9 is an explanatory view of the preferred embodiment of the first image display system of the invention.

FIG. 9 shows optical paths of a light beam 201 and a light beam 202 emitted from one point on the first image display surface 20a in the image display system 13. For example, it is assumed that the light beam 201 and the light beam 202 are s-polarized light in a case of being emitted from the first image display unit 20.

The light beam 201 and the light beam 202 are transmitted through the absorption polarizer 21 and are incident on the beam splitter 40. A part of the light beam 201 and the light beam 202 incident on the beam splitter 40 in a state of s-polarized light is specularly reflected from the surface of the half mirror 42, that is, the transflective surface 40a of the beam splitter 40, and the virtual image B of the first image displayed on the first image display surface 20a is formed at a position surface-symmetrical with respect to the transflective surface 40a. In this case, an angle between the virtual image B and the image display surface 20a of the first image display unit 20 is $2\alpha_1$.

The light beam 201 and the light beam 202 specularly reflected from the beam splitter 40 pass through the quarter-wave retardation plate 41 twice and are subjected to polarization conversion to p-polarized light. For this reason, most of the light beam 201 and the light beam 202 is transmitted through the absorption polarizer 30 in a case of being incident on the absorption polarizer 30, and the virtual image B is viewed from the viewing side.

Figure 10:
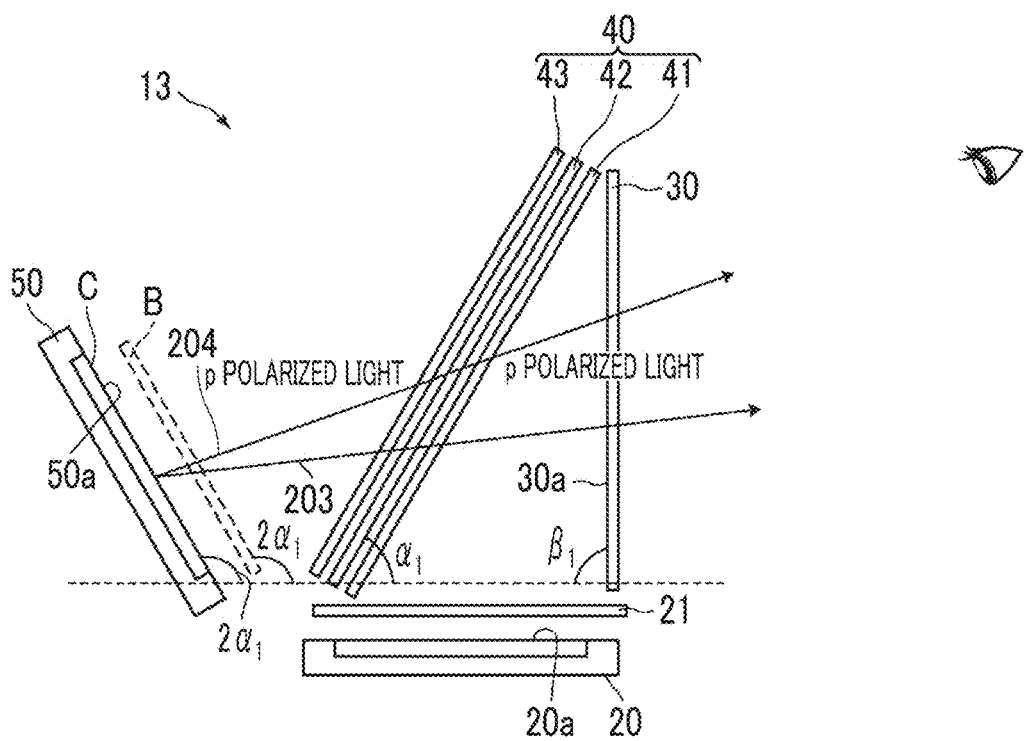
FIG. 10 is an explanatory view of the preferred embodiment of the first image display system of the invention.

FIG. 10 shows optical paths of a light beam 203 and a light beam 204 emitted from one point on the second image display surface 50a of the second image display unit 50 in the image display system 13. For example, it is assumed that the light beam 203 and the light beam 204 are p-polarized light. A part of the light beam 203 and the light beam 204 is transmitted through the quarter-wave retardation plate 43, the half mirror 42, and the quarter-wave retardation plate 41 in this order. In this case, the slow axis of the quarter-wave retardation plate 43 is perpendicular to the slow axis of the quarter-wave retardation plate 41, whereby the second emission light transmitted through the beam splitter 40 is in a state of p-polarized light. Accordingly, most of the second emission light is transmitted through the absorption polarizer 30, and the second image displayed on the second image display surface 50a is viewed as the transmission image C.

The first image display unit 20 and the second image display unit 50 are provided such that the angle between the second image display surface 50a of the second image display unit 50 and the first image display surface 20a of the first image display unit 20 becomes $2\alpha_1$, whereby the virtual image B and the transmission image C are parallel to each other, and are viewed as a superimposed image to the viewer.

In this way, the image display system 13 of the embodiment can display the virtual image B and the transmission image C in a superimposed manner. Furthermore, the image display system 13 can display a high-brightness superimposed image with space saving while restraining a direct image disturbing watching of the superimposed image from being viewed.

[Form of Second Image Display System of the Invention]

Figure 11:
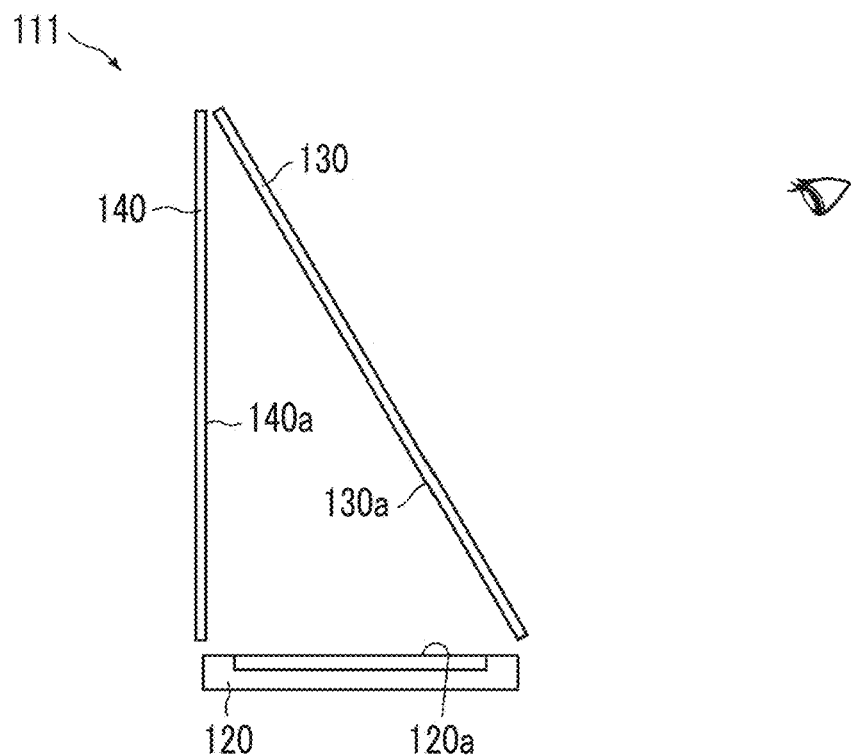
FIG. 11 is a schematic configuration diagram showing an embodiment of a second image display system of the invention.

FIG. 11 shows an embodiment of a second image display system of the invention. An image display system 111 comprises a first image display unit 120, a reflective polarizer 130, and a beam splitter 140 on different surfaces. In the image display system 111, the reflective polarizer 130 and the beam splitter 140 are provided in this order from a viewing side.

The first image display unit 120 has a first image display surface 120a for displaying a first image and emits first emission light as first polarized light.

The reflective polarizer 130 reflects the first polarized light and transmits second polarized light different from the first polarized light, and is arranged at a position where the first emission light emitted from the first image display unit 120 is incident. The position where the reflective polarizer 130 is arranged is a position where reflected light further reflected from the beam splitter 140 by way of the reflective polarizer 130 out of the first emission light is incident.

The beam splitter 140 has a transflective surface 140a for transmitting a part of incident light and reflecting another part of incident light, and the transflective surface 140a is arranged at a position where the first emission light reflected from the reflective polarizer 130 is incident. The beam splitter 140 has a function of changing the polarized light of the first emission light and reflecting the first emission light. Here, "changing the polarized light of the first emission light" means changing the first emission light as first polarized light to light including polarized light other than the first polarized light, and includes not only a case where the polarized light of the first emission light is changed to light including the second polarized light different from the first polarized light, but also a case where the polarized light of the first emission light is converted to polarized light having both components of the first polarized light and the second polarized light.

With the above-described configuration, the image display system 111 allows a virtual image of the first image displayed on the first image display surface 120a of the first image display unit 120 to be viewed through the beam splitter 140 and the reflective polarizer 130. The principle of image display of the image display system 111 will be described referring to FIG. 12.

Figure 12:
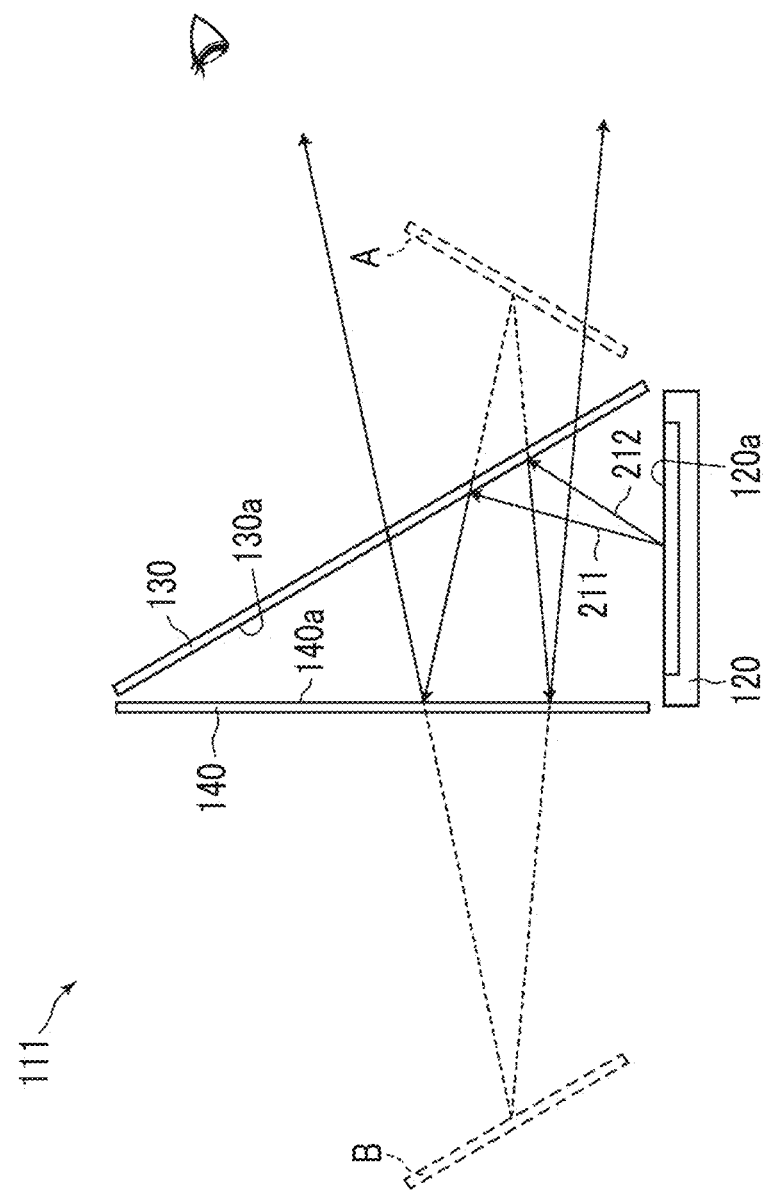
FIG. 12 is an explanatory view of the embodiment of the second image display system of the invention.

FIG. 12 shows optical paths of a light beam 211 and a light beam 212 emitted from one point on the first image display surface 120a of the first image display unit 120 at different angles. The light beam 211 and the light beam 212 are specularly reflected from the reflective polarizer 130 and form a virtual image A at a position surface-symmetrical to the first image display surface 120a with respect to a surface 130a of the reflective polarizer 130. The subsequent optical paths of the light beams can be supposed to be the same as the optical paths of the light beams emitted from the virtual image A. The virtual image A is an image that is not viewed from the viewing side.

At least a part of the light beams specularly reflected from the reflective polarizer 130 is specularly reflected from the beam splitter 140 and form a virtual image B at a position surface-symmetrical to the virtual image A with respect to the transflective surface 140a of the beam splitter 140. The subsequent optical paths of the light beams can be supposed to be the same as the optical paths of the light beams emitted from the virtual image B. Thereafter, at least a part of the light beams is transmitted through the reflective polarizer 130 and is emitted to the viewing side. Accordingly, the virtual image B is visible.

Figure 13:
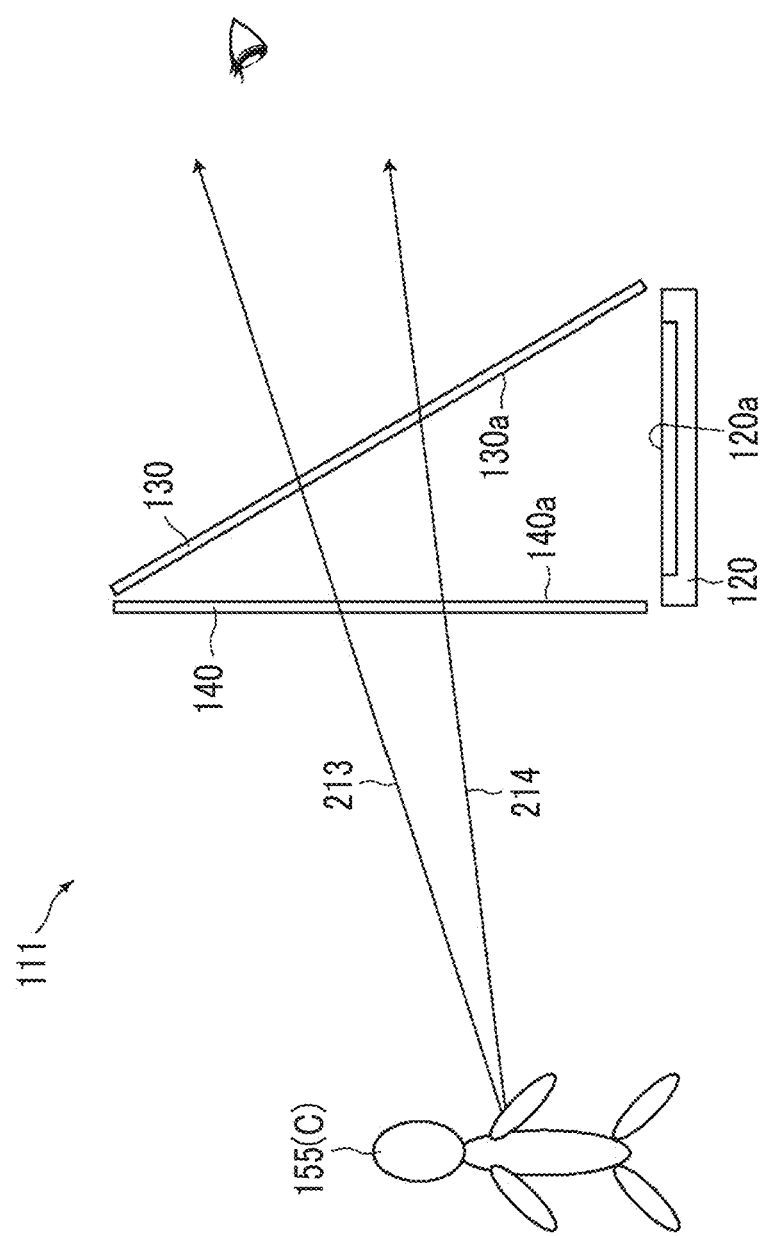
FIG. 13 is an explanatory view of the embodiment of the second image display system of the invention.

FIG. 13 shows a case where a real object 155 is provided on a side opposite to the viewing side of the beam splitter 140 in the image display system 111. At least a part of a light beam 213 and a light beam 214 emitted from the real object 155 is transmitted through the beam splitter 140, then, is further transmitted through the reflective polarizer 130, and is emitted to the viewing side. Accordingly, an image of the real object 155 is visible as a transmission image C through the reflective polarizer 130 and the beam splitter 140.

Figure 14:
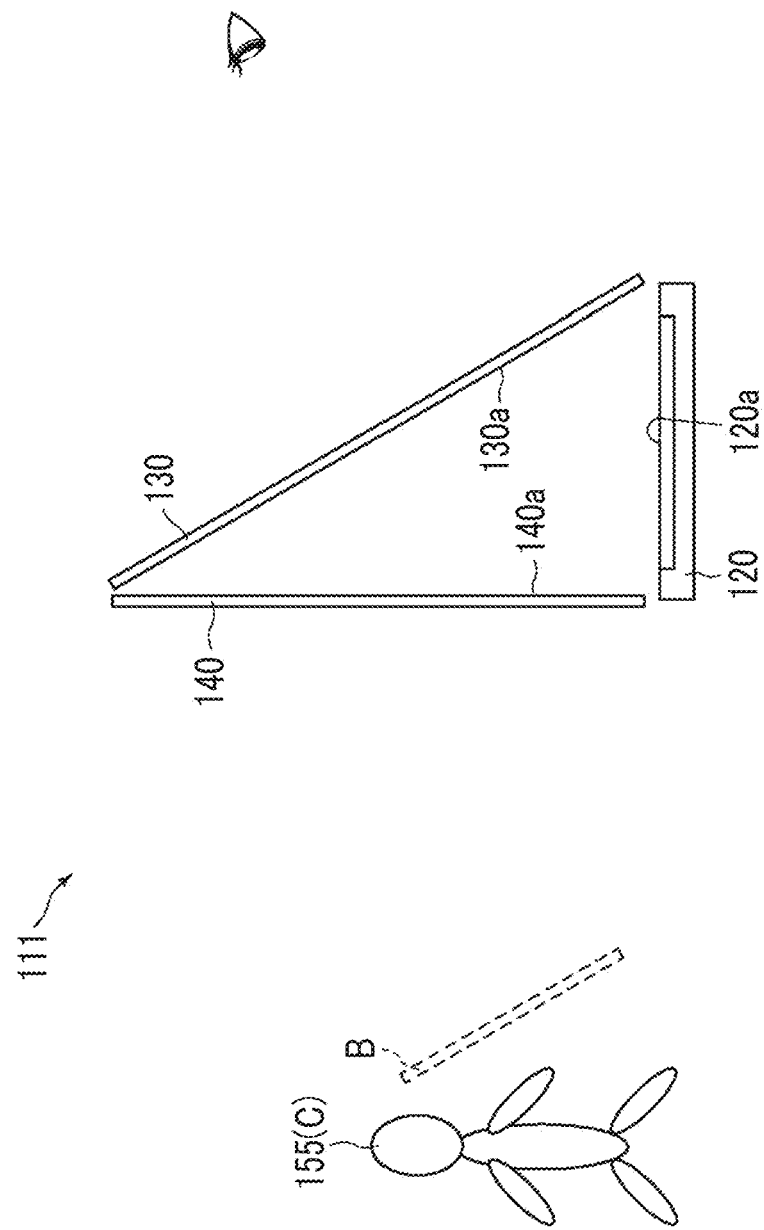
FIG. 14 is an explanatory view of the embodiment of the second image display system of the invention.

With the above, in the image display system 111, as shown in FIG. 14, the virtual image B and the transmission image C are viewed in a superimposed manner to the viewer. A position where the real object 155 is provided is adjusted, whereby the virtual image B may be displayed in front of the transmission image C, or the virtual image B may be displayed at the back of the transmission image C. The real object 155 may be a moving object or may make the transmission image C to be viewed through the virtual image B.

The real object 155 may be, for example, a person. In this case, as the virtual image B, a motion image adjusted to the motion of the person is displayed, whereby it is possible to increase a stage effect in a theater, a concert hall, or the like.

[Another Form of Second Image Display System of the Invention]

Next, a case where a second image display unit is provided in the second image display system of the invention will be described.

Figure 15:
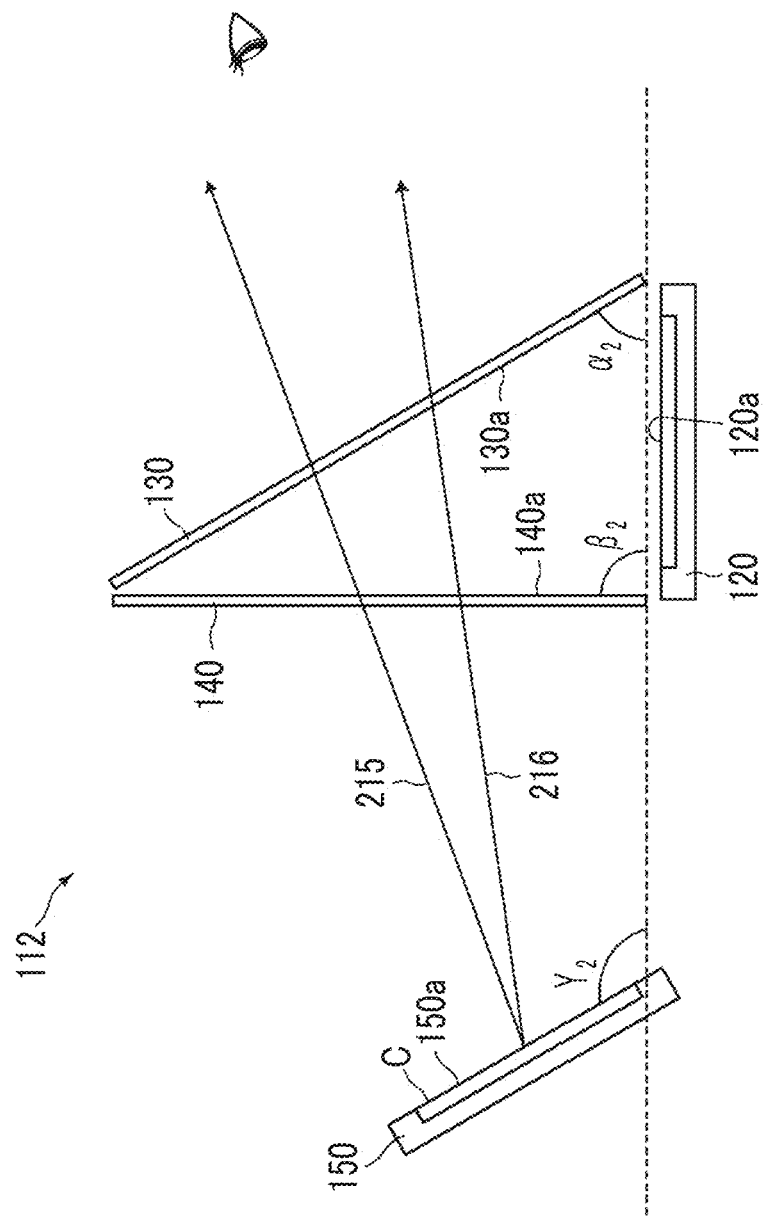
FIG. 15 is a schematic configuration diagram showing another embodiment of the second image display system of the invention.

An image display system 112 shown in FIG. 15 comprises the first image display unit 120, the reflective polarizer 130, and the beam splitter 140 on different surfaces. The image display system 112 is common with the image display system 111 in that the reflective polarizer 130 and the beam splitter 140 are provided in this order from the viewing side.

In addition, the image display system 112 comprises a second image display unit 150 on a side opposite to the viewing side of the beam splitter 140.

At least a part of a light beam 215 and a light beam 216 emitted from the second image display unit 150 is transmitted through the beam splitter 140, then, is further transmitted through the reflective polarizer 130, and is emitted to the viewing side. Accordingly, the second image displayed on the second image display unit 150 is viewed as the transmission image C through the reflective polarizer 130 and the beam splitter 140.

Figure 16:
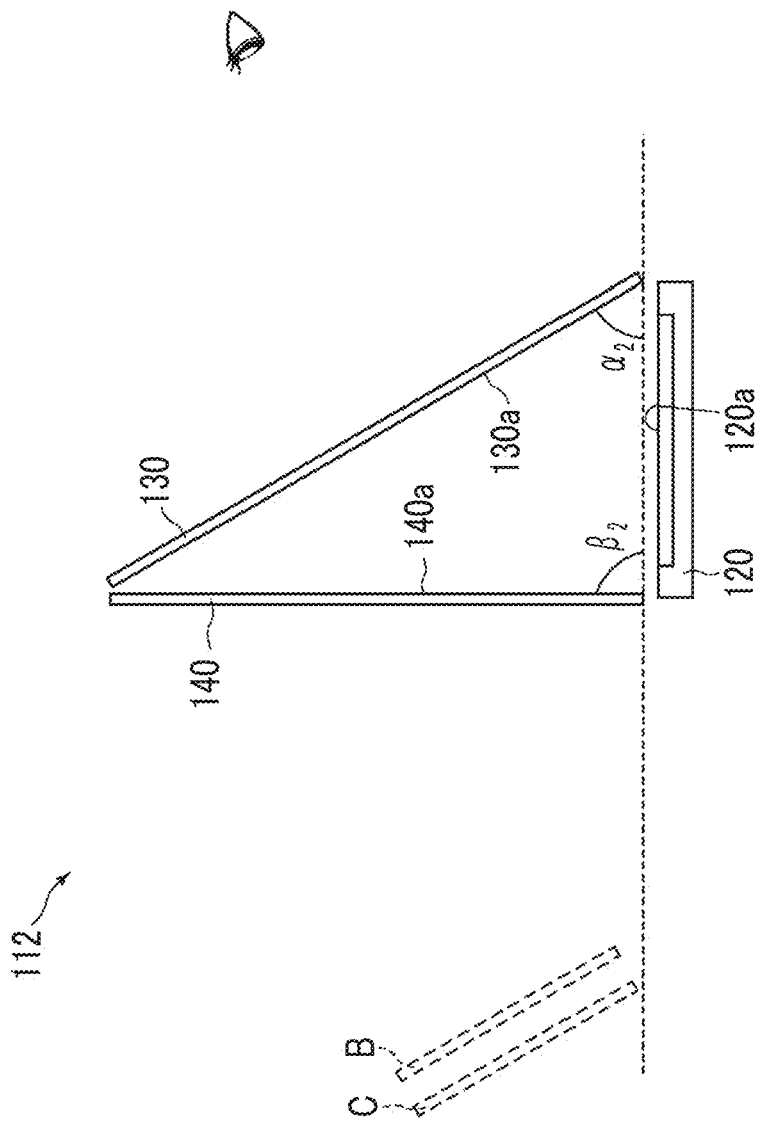
FIG. 16 is an explanatory view of another embodiment of the second image display system of the invention.

At least a part of the light beams emitted from the first image display unit 120 passes through the same optical paths as in a case described referring to FIG. 12, and the first image displayed on the first image display unit 120 is viewed as the virtual image B. Accordingly, as shown in FIG. 16, the virtual image B and the transmission image C are viewed in a superimposed manner to the viewer. A position where the second image display unit 150 is provided is adjusted, whereby the virtual image B may be displayed in front of the transmission image C or may the transmission image C may be displayed in front of the virtual image B.

In the image display system 112, as in a case of the first image display system of the invention, as shown in FIG. 7, the map image 300 is displayed as the transmission image C, and the additional image 301, such as navigation information, is displayed as the virtual image B, whereby it is possible to generate the superimposed image 302 in which the map image 300 and the additional image 301 are superimposed. In this case, the additional image 301 is viewed so as to be floated above the map image 300, and there is an advantage that the map image 300 and the additional image 301 are easily identified at first sight.

Details of the elements in the second image display system of the above-described embodiment will be described below.

[First Image Display Unit]

The first image display unit 120 is provided on a side opposite to the viewing side of the reflective polarizer.

The image display surface 120a of the first image display unit 120 may be a plane or may be a curved surface. In a case where the image display surface is a curved surface, the virtual image B also becomes curved, and the image can be made to be stereoscopically viewed or a stage effect in a theater or the like can be increased.

The first image display unit 120 emits the first polarized light as emission light. Means for displaying an image may be a still image or a photograph or may be an image display device. As the image display device, a liquid crystal display device, an organic EL display device, or the like can be suitably used. Between the liquid crystal display device and the organic EL display device, a display device in which emission light becomes linearly polarized light is known, and the display device can be suitably used as the first image display unit 120. The first image display unit 120 may comprise an image display device that emits a still image, a photograph, or emission light as non-polarized light, and an absorption polarizer for emission light polarization adjustment that transmits the first polarized light and absorbs the second polarized light different from the first polarized light on an image display surface of the image display device. The still image, the photograph, or the second polarized light out of the light from the image display device is absorbed in the absorption polarizer for emission light polarization adjustment, and as a result, emission light as the first polarized light can be obtained.

The first polarized light may be linearly polarized light or may be circularly polarized light. In a case where the first polarized light is linearly polarized light, the second polarized light is linearly polarized light perpendicular to the first polarized light. In a case where the first polarized light is circularly polarized light, the second polarized light is circularly polarized light in an opposite direction to the first polarized light.

The first polarized light is emitted from the first image display unit 120, whereby it is possible to provide the first image display unit 120 such that most of the light beams emitted from the first image display unit 120 is reflected from the reflective polarizer 130, and it is possible to restrain the display of the first image display unit 120 from being directly viewed.

Even in a case where the first image display unit 120 is configured of the image display device that emits the first polarized light, an absorption polarizer that absorbs the second polarized light may be provided on the image display surface. In this way, it is possible to restrain a region other than the first image display surface 120*a* of the first image display unit 120, that is, an image display region, from being directly viewed.

[Reflective Polarizer]

The reflective polarizer 130 is an optical member that specularly reflects the first polarized light and transmits the second polarized light different from the first polarized light. Polarized light to be reflected and transmitted may be linearly polarized light or may be circularly polarized light. As the reflective polarizer 130, a reflective polarizer having a selective reflection property of linearly polarized light is preferably used. Since the first emission light from the first image display unit 120 is the first polarized light, the first emission light is specularly reflected from the reflective polarizer that reflects the first polarized light, and is not emitted to the viewing side.

It is preferable that an angle $\alpha_2$ between the image display surface 120*a* of the first image display unit 120 and the surface 130*a* of the reflective polarizer 130 satisfies the following expression.

$$0°<\alpha_2<90°$$

In a case where $\alpha_2$ is within the above-described range, it is preferable that the virtual image B is visible at an angle at which the virtual image B is easily viewed to the viewer. In a case where the image display surface 120*a* is a curved surface, the angle between the image display surface 120*a* and the surface 130*a* described above is set to an angle between a tangent at a point to be the most convex portion of the image display surface 120*a* and the surface 130*a*.

As the reflective polarizer 130, as described in JP2011-053705A, a film obtained by stretching a dielectric multi-layer film, a wire grid polarizer, or the like can be used. As a commercial product, a reflective polarizer (product name: APF) manufactured by 3M Company, a wire grid polarizer (product name: WGF) manufactured by Asahi Kasei Corporation, or the like can be suitably used.

An absorption polarizer may be laminated on the surface of the reflective polarizer 130 on the viewing side such that a transmission axis of the absorption polarizer coincides with a transmission axis of the reflective polarizer. With this, it is possible to suppress reflection of external light incident from the viewing side to the reflective polarizer, and to improve visibility of an image.

It is preferable that anti-reflection treatment is applied to the surface of the reflective polarizer 130. As the anti-reflection treatment, laminating a thin film having a specific refractive index and a film thickness or laminating a moth-eye film is included in order to reduce reflectance of visible light. The anti-reflection treatment is applied, whereby it is possible to suppress unnecessary reflection on the surface of the reflective polarizer 130, and to suppress the occurrence of stray light causing deterioration of visibility of an image or reflection of external light.

[Beam Splitter]

The beam splitter 140 is a semi-transmissive optical member that specularly reflects a part of incident light and transmits remaining light. In order to obtain an image with no distortion, it is preferable that the transflective surface 140*a* of the beam splitter 140 is a plane.

The beam splitter 140 is provided on the side opposite to the viewing side of the reflective polarizer 130 and the first image display unit 120. It is preferable that an angle $\beta_2$ between the first image display surface 120*a* of the first image display unit 120 and the transflective surface 140*a* of the beam splitter 140 is $85°<\beta_2<95°$. In this case, it is preferable since the virtual image B is viewed at an angle at which the virtual image B is easily viewed.

The beam splitter 140 is provided so as to change the polarization state of the light beam reflected from the reflective polarizer 130 and reflect the light beam. In a case where the beam splitter 140 is provided in this way, light reflected from the beam splitter 140 changes in the polarization state. For this reason, light can be transmitted through the reflective polarizer 130 in a case of being incident on the reflective polarizer 130 again, and can be emitted to the viewing side.

For example, in a case where a reflective polarizer having a selective reflection property of linearly polarized light is used as the reflective polarizer 130, it is preferable that a reflective polarizer having a selective reflection property of circularly polarized light is used as the beam splitter 140. It is preferable since, in a case where linearly polarized light is incident, the reflective polarizer having the selective reflection property of circularly polarized light changes a part of incident light to circularly polarized light and reflects circularly polarized light.

In a case where a reflective polarizer having a selective reflection property of linearly polarized light is used as the reflective polarizer 130, it is preferable that a reflective polarizer having a selective reflection property of linearly polarized light is used as the beam splitter 140, and is provided such that an angle between a transmission axis of the reflective polarizer and a transmission axis of the beam splitter becomes about 45° in a case of being viewed from the viewing side.

It is also preferable that a half mirror, a polarization selective reflection member, or a wavelength selective reflection member with a polarization conversion element laminated on a surface thereof on the viewing side is used as the beam splitter 140. In this case, it is preferable since the polarization state of incident light can be changed and incident light can be reflected.

In a case where a wavelength selective reflection member is used as the beam splitter 140, it is preferable that the wavelength selective reflection member is designed so as to selectively reflect a wavelength range including a wavelength of emission light from the first image display unit. In this case, it is preferable since the reflectance of the light beam reflected from the reflective polarizer 130 can be increased, and the brightness of the virtual image B can be improved. In a case where the second image display unit 150 is provided on the side opposite to the viewing side of the beam splitter 140, it is preferable that the second image display unit 150 is designed so as to selectively transmit a wavelength range including a wavelength of emission light from the second image display unit 150. In this case, it is preferable since the transmittance of emission light from the second image display unit 150 can be increased, and the brightness of the transmission image C can be improved.

[Polarization Conversion Element]

In a case where a polarization conversion element is laminated on the surface of the beam splitter, as the polarization conversion element, a depolarization element or a retardation plate can be used.

As the polarization conversion element that is provided on the surface of the beam splitter, a quarter-wave retardation plate is preferably used. In a case where a reflective polarizer having a selective reflection property of linearly polarized light is used as the reflective polarizer 130, it is preferable that the quarter-wave retardation plate is provided such that an angle between a transmission axis of the reflective polarizer and a slow axis of the quarter-wave retardation plate becomes about 45° in a case of being viewed from the viewing side.

The quarter-wave retardation plate may have a phase difference to be about ¼ wavelength in any wavelength of a visible range. For example, a retardation plate having a phase difference of about 138 nm in a wavelength of 550 nm can be suitably used. In order to reduce color unevenness of the virtual image B and the transmission image C, it is preferable that the quarter-wave retardation plate has reverse dispersibility to a wavelength. Here, the reverse dispersibility to the wavelength means that, as the wavelength increases, the value of the phase difference in the wavelength increases.

In a case where the second image display unit 150 is provided on the side opposite to the viewing side of the beam splitter, in order to increase the transmittance of emission light from the second image display unit 150, a polarization conversion element may be provided on the side opposite to the viewing side of the beam splitter 140.

[Second Image Display Unit]

The second image display unit 150 is provided on the side opposite to the viewing side of the beam splitter 140. The second image display surface 150a of the second image display unit 150 may be a plane or may be a curved surface. The second image display unit 150 may be a still image or a photograph or may be an image display device.

It is preferable that an image display device that emits polarized light is used as the second image display unit 150. In this case, a beam splitter having a polarization selective reflection member is used as the beam splitter 140, whereby it is possible to provide the second image display unit 150 such that most of the light beam emitted from the second image display unit 150 is transmitted through the beam splitter and the reflective polarizer 130, and the brightness of the transmission image C can be increased. As the image display device, a liquid crystal display device, an organic EL display device, or the like can be suitably used.

Although an angle $\gamma_2$ between the second image display surface 150a of the second image display unit 150 and the first image display surface 120a of the first image display unit 120 can be optionally set, it is preferable that the angle $\gamma_2$ is set such that the virtual image B and the transmission image C are parallel to each other. For example, in a case where an angle $\beta_2$ between a surface including the first image display unit and a surface including the second beam splitter is 90°, the following expression is satisfied.

$$\gamma_2 = 2\alpha_2$$

With this, the virtual image B and the transmission image C can be made parallel to each other.

[Example of Preferred Embodiment]

A preferred embodiment of the second image display system of the invention will be described in more detail referring to FIGS. 17 to 20.

Figure 17:
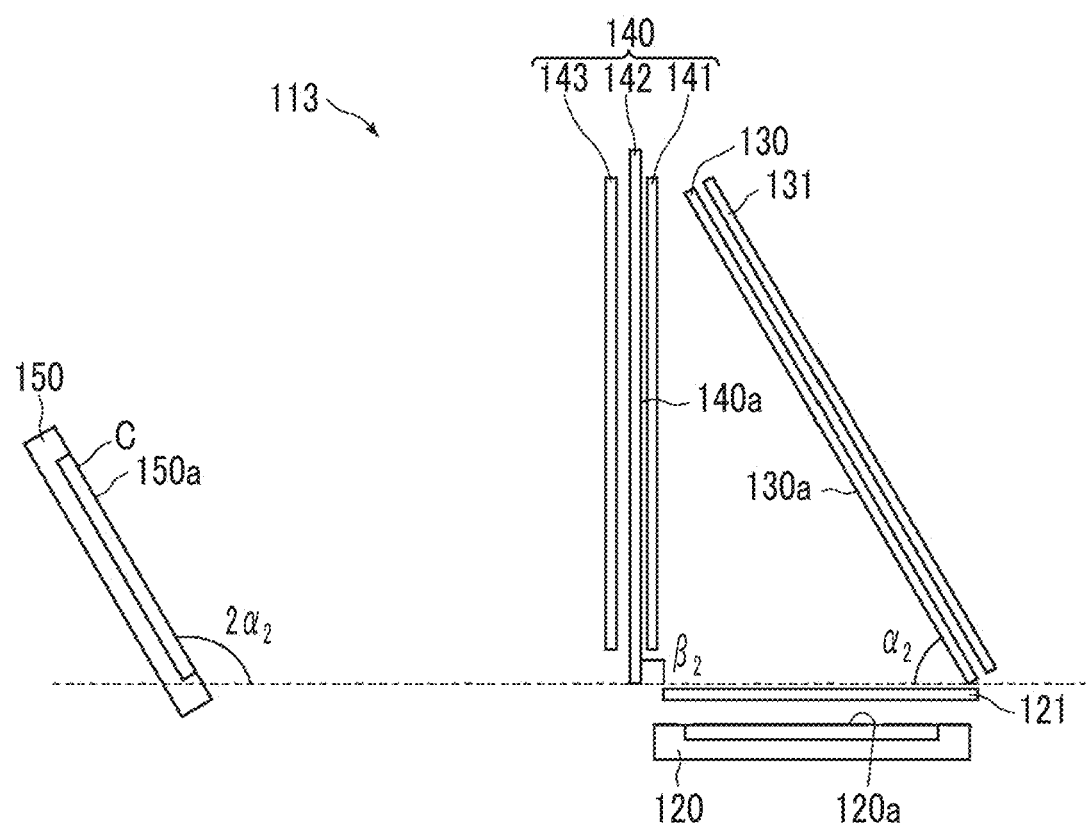
FIG. 17 is a schematic configuration diagram showing a preferred embodiment of the second image display system of the invention.

FIG. 17 shows a preferred embodiment of the invention. An image display system 113 comprises the first image display unit 120, the reflective polarizer 130, and the beam splitter 140 on different surfaces. The reflective polarizer 130 and the beam splitter 140 are provided in this order from the viewing side. In addition, the image display system 113 comprises the second image display unit 150 on the side opposite to the viewing side of the beam splitter 140.

An angle between the first image display surface 120a of the first image display unit 120 and the surface 130a of the reflective polarizer 130 is $\alpha_2$. For example, $\alpha_2$ is 60°. An angle $\beta_2$ between the first image display surface 120a of the first image display unit 120 and the transflective surface 140a of the beam splitter 140 is 90°.

The first image display unit 120 is a liquid crystal display device that emits linearly polarized light (first polarized light). In addition, an absorption polarizer 121 is provided on the first image display surface 120a of the first image display unit 120. The absorption polarizer 121 is provided in a direction to transmit emission light from the first image display unit 120.

An absorption polarizer 131 is provided on the viewing side of the reflective polarizer 130 such that a transmission axis of the absorption polarizer 131 coincides with a transmission axis of the reflective polarizer 130.

The beam splitter 140 has a quarter-wave retardation plate 141, a half mirror 142, and a quarter-wave retardation plate 143 laminated in this order from the viewing side, and is provided such that, in a case of being viewed from the viewing side, an angle between a transmission axis of the reflective polarizer 130 and a slow axis of the quarter-wave retardation plate 141 becomes 45°, and an angle between the slow axis of the quarter-wave retardation plate 141 and a slow axis of the quarter-wave retardation plate 143 becomes 90°.

The second image display unit 150 is provided such that the second image display surface 150a and the first image display surface 120a of the first image display unit 120 becomes $2\alpha_2$.

Figure 18:
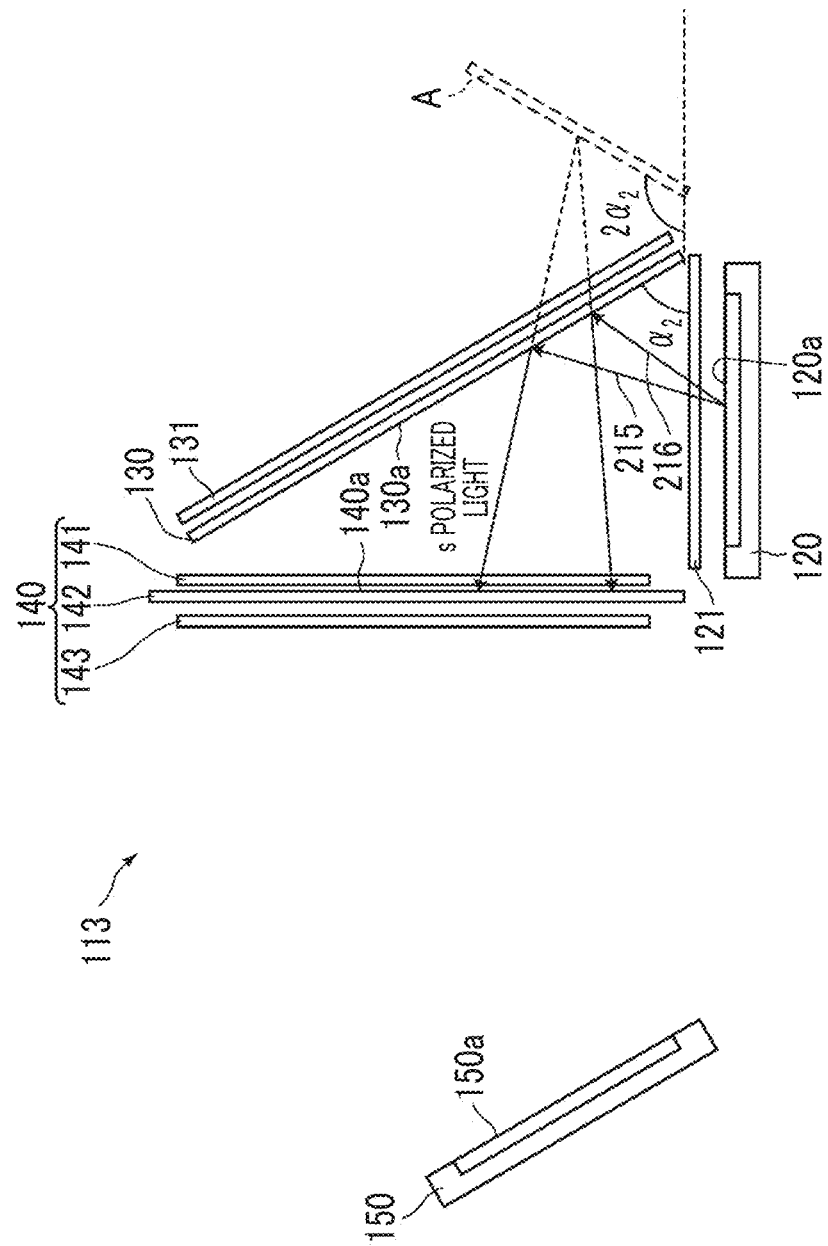
FIG. 18 is an explanatory view of the preferred embodiment of the second image display system of the invention.

FIG. 18 shows optical paths of a light beam 215 and a light beam 216 emitted from one point on the first image display surface 120a of the first image display unit 120 in the image display system 113. For example, it is assumed that the light beam 215 and the light beam 216 are s-polarized light emitted from the first image display unit 120.

The light beam 215 and the light beam 216 are transmitted through the absorption polarizer 121 and are incident on the reflective polarizer 130. The reflective polarizer 130 is provided in a direction to reflect s-polarized light, most of the light beam 215 and the light beam 216 is specularly reflected, and a virtual image A is formed at a position surface-symmetrical with respect to the surface 130a of the reflective polarizer 130. In this case, an angle between the virtual image A and the first image display surface 120a of the first image display unit 120 is $2\alpha_2$. The virtual image A is not viewed from the viewing side. The absorption polarizer 121 is provided, whereby the first image display surface 120a of the first image display unit 120 and other regions are not directly viewed from the viewing side.

Figure 19:
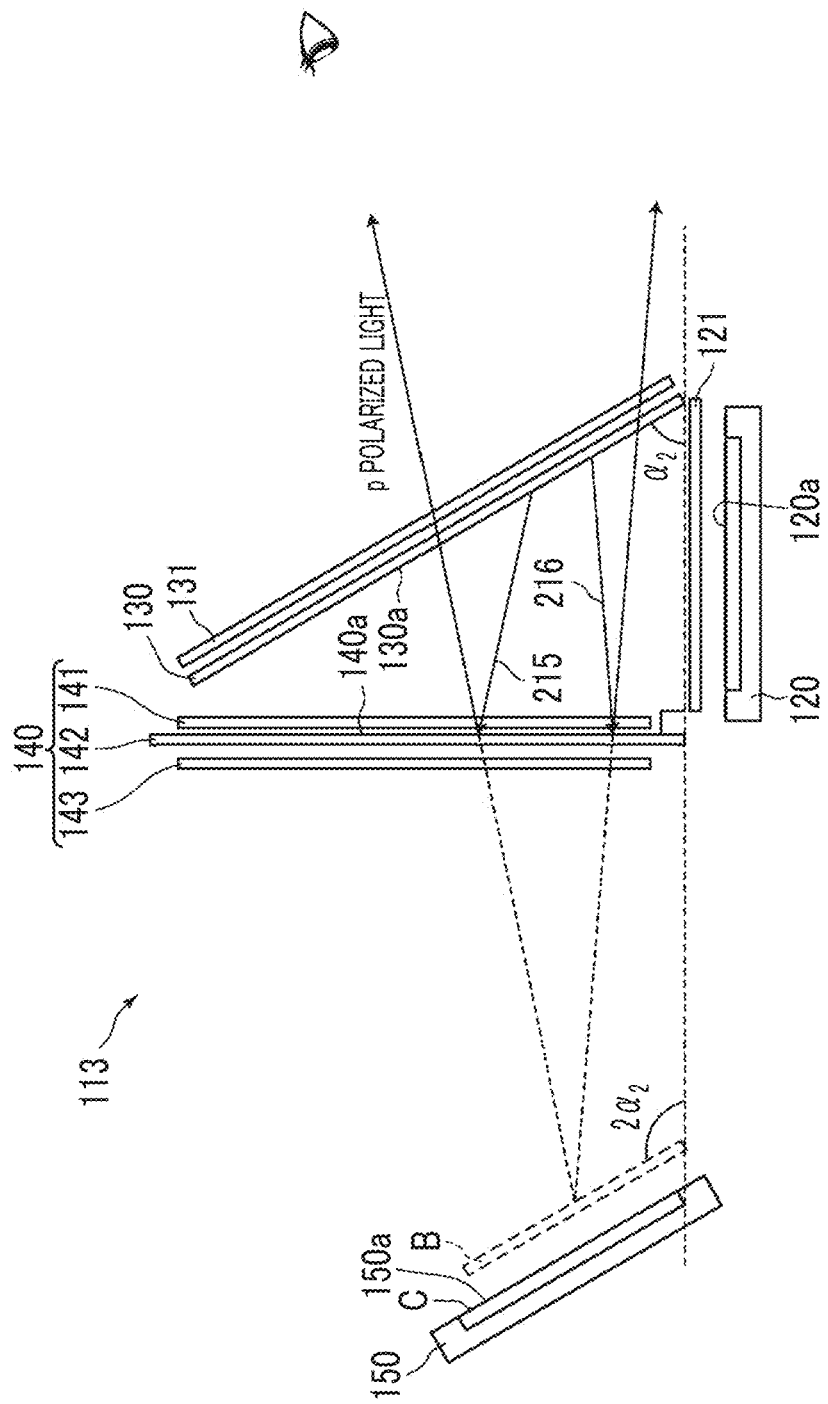
FIG. 19 is an explanatory view of the preferred embodiment of the second image display system of the invention

FIG. 19 shows optical paths of the light beam 215 and the light beam 216 after specularly reflected from the reflective polarizer 130. A part of the light beam 215 and the light beam 216 incident on the beam splitter 140 in a state of s-polarized light is specularly reflected from a surface of the half mirror 142 (that is, the transflective surface 140a of the beam splitter 140), and the virtual image B is formed at a position surface-symmetrical to the virtual image A with respect to the transflective surface 140a of the beam splitter 140. Since $\beta_2$ is 90°, an angle between the virtual image B and the first image display surface 120a of the first image display unit 120 is $2\alpha_2$.

The light beam 215 and the light beam 216 specularly reflected from the beam splitter 140 pass through the quarter-wave retardation plate 141 twice and are subjected to polarization conversion to p-polarized light. For this reason, most of the light beam 215 and the light beam 216 is transmitted through the reflective polarizer 130 in a case of being incident on the reflective polarizer 130, and the virtual image B is viewed from the viewing side.

Figure 20:
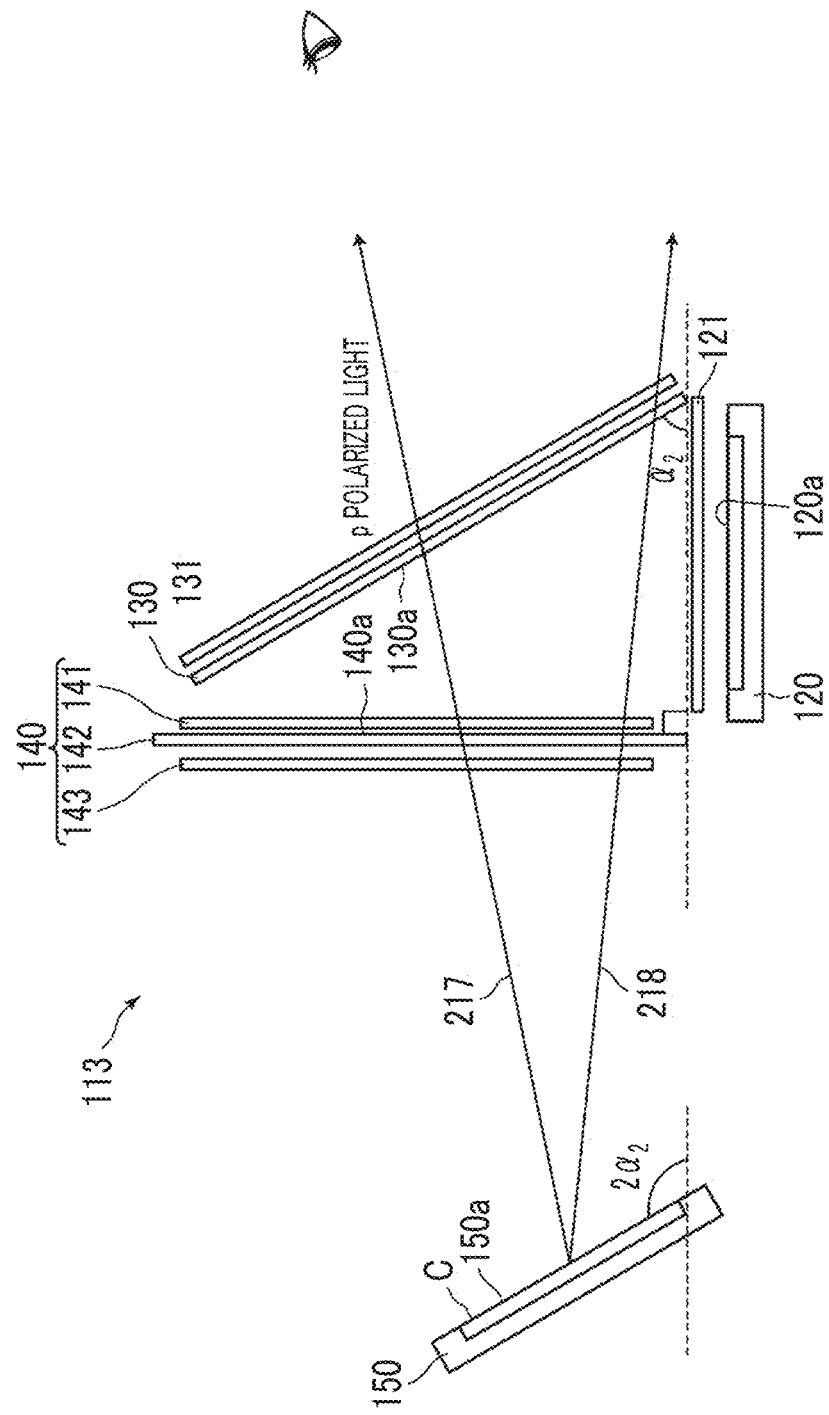
FIG. 20 is an explanatory view of the preferred embodiment of the second image display system of the invention.

FIG. 20 shows optical paths of a light beam 217 and a light beam 218 emitted from one point on the second image display surface 150a of the second image display unit 150 in the image display system 113. For example, it is assumed that the light beam 217 and the light beam 218 are p-polarized light. A part of the light beam 217 and the light beam 218 is transmitted through the quarter-wave retardation plate 143, the half mirror 142, and the quarter-wave retardation plate 141 in this order. In this case, the slow axis of the quarter-wave retardation plate 143 is perpendicular to the slow axis of the quarter-wave retardation plate 141, whereby the second emission light transmitted through the beam splitter 140 is in a state of p-polarized light. Accordingly, most of the light beams is transmitted through the reflective polarizer 130, and the second image displayed on the second image display surface 150a is viewed as the transmission image C.

The first and second image display units 120 and 150 are provided such that the angle between the second image display surface 150a of the second image display unit 150 and the first image display surface 120a of the first image display unit 120 becomes $2\alpha_2$, whereby the virtual image B and the transmission image C are parallel to each other and are viewed as a superimposed image to the viewer.

In this way, the image display system 113 of the embodiment can display the virtual image B and the transmission image C in a superimposed manner. Furthermore, the image display system 113 can display a high-brightness superimposed image with space saving while restraining a direct image disturbing watching of the superimposed image from being viewed.

In the first and second image display systems of the invention described above, since a transmissive display device is not used, it is possible to display a high-brightness superimposed image. In addition, in the first and second image display systems of the invention, there is no need to provide a device, such as a projector, on the viewing side of the absorption polarizer or the reflective polarizer, and it is possible to provide a system with space saving.

EXAMPLES

The features of the invention will be further specifically described below in connection with examples. A material, an amount used, a ratio, a treatment detail, a treatment order, and the like described below can be suitably changed without departing from the spirit and scope of the invention. Furthermore, other configurations than the following configurations can be adapted without departing from the spirit and scope of the invention.

[Manufacture of Beam Splitter]

Aluminum was vacuum-deposited on one surface of a glass plate 60 having a thickness of 1 mm, and a half mirror 70 with transmittance of 50% was produced.

A wire grid polarizer (product name: WGF, manufactured by Asahi Kasei Corporation) 61 and an absorption polarizer 62 were laminated on one surface of the glass plate 60 having a thickness of 1 mm in this order such that the directions of the transmission axes thereof coincided with each other, and a polarization beam splitter 71 (PBS 71) was produced.

Reverse dispersible polycarbonate quarter-wave retardation films (product name: PURE-ACE WR W-142, manufactured by TEIJIN Ltd.) 63 and 64 were laminated on both surfaces of a half mirror 70 in directions in which the directions of the slow axes were perpendicular to each other, and a half mirror 72 with a quarter-wave retardation plate was produced.

Example 1

Figure 21:
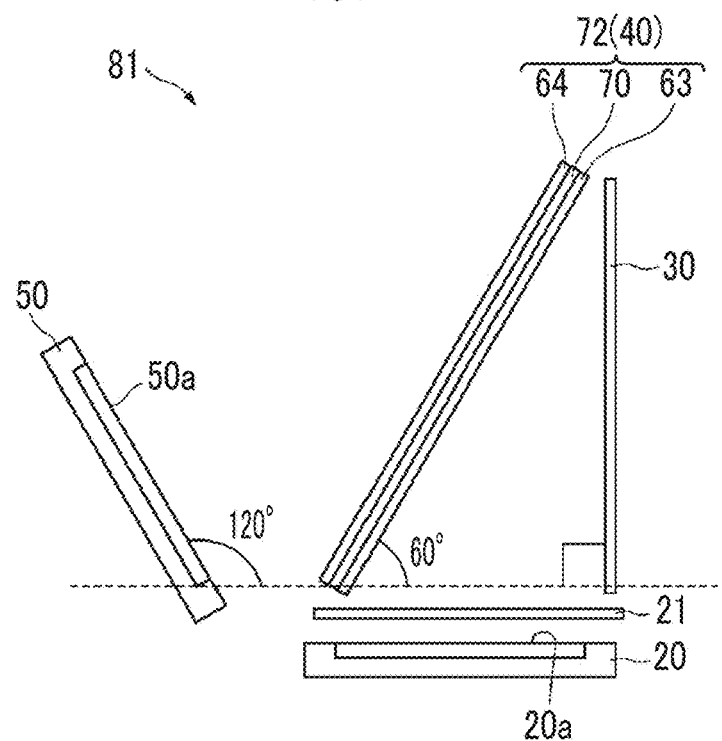
FIG. 21 is a schematic view showing an image display system of Example 1.

Example 1 is a specific configuration example of the first image display system of the invention. FIG. 21 shows the schematic configuration of Example 1.

A tablet terminal Kindle fire HDX manufactured by Amazon.com, Inc. was provided such that an image display surface 20a turned upward, thereby obtaining the first image display unit 20 (hereinafter, a surface on which the first image display unit 20 is provided is referred to as a "bottom surface"). Light emitted from Kindle fire HDX was linearly polarized light (first polarized light).

Next, the absorption polarizer 21 was provided on the image display surface 20a of the first image display unit 20 such that the transmission axis became a direction to transmit linearly polarized light emitted from the first image display unit 20.

Next, the absorption polarizer 30 was provided such that an angle to the image display surface 20a of the first image display unit 20 became 90° at a position on the viewing side from the first image display unit 20. In addition, as the beam splitter 40, the half mirror 72 with a quarter-wave retardation plate was provided such that an angle to the image display surface 20a of the first image display unit 20 became 60° at a position on a side opposite to the viewing side from the first image display unit 20 and such that a slow axis of the quarter-wave retardation film 63 became 45° to a transmission axis of the absorption polarizer 30 in a case of being viewed from the viewing side.

A table terminal Kindle fire HDX manufactured by Amazon.com, Inc. was provided on a side opposite to the viewing side of the half mirror 72 with a quarter-wave retardation plate such that an angle between an image display surface 50a and the image display surface 20a of the first image display unit 20 became 120°, thereby obtaining the second image display unit 50.

In this way, an image display system 81 of Example 1 was produced.

Examples 2 to 6 are specific configuration examples of the second image display system of the invention.

Example 2

Figure 22:
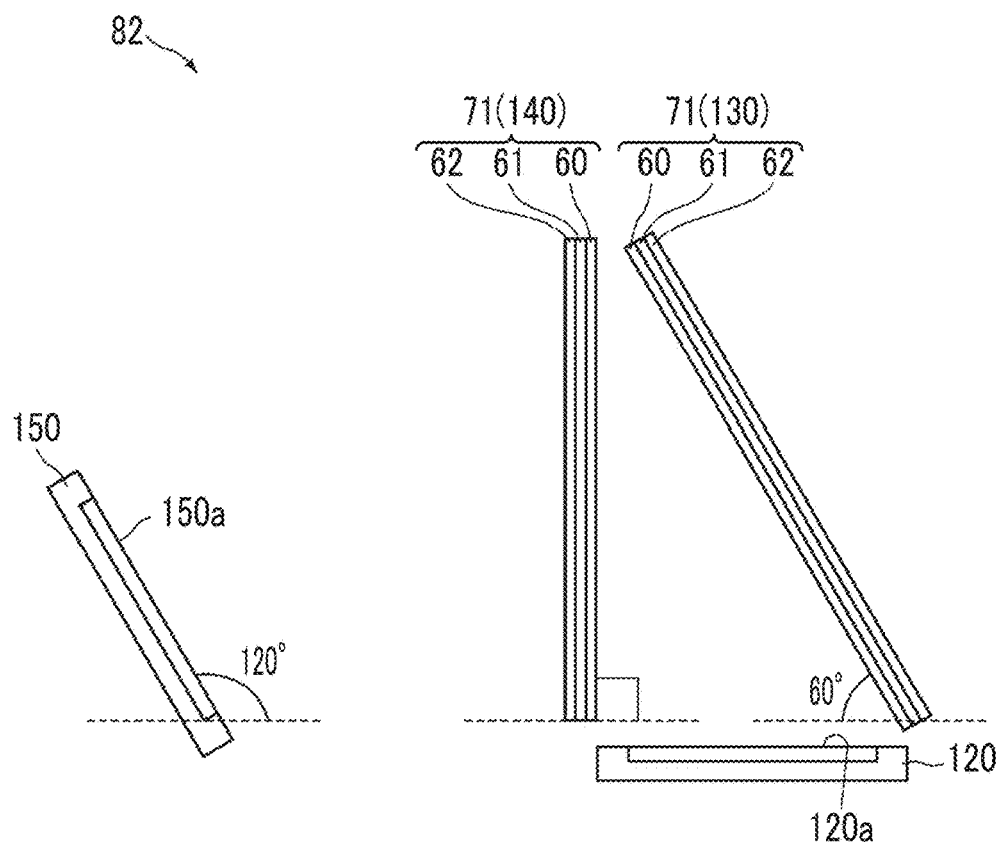
FIG. 22 is a schematic view showing an image display system of Example 2.

FIG. 22 shows the schematic configuration of an image display system 82 of Example 2.

A tablet terminal Kindle fire HDX manufactured by Amazon.com, Inc. was provided such that an image display surface 120a turned upward, thereby obtaining the first image display unit 120. Light emitted from Kindle fire HDX was linearly polarized light.

Next, as the reflective polarizer 130, the polarization beam splitter 71 was provided such that an angle to the image display surface 120a of the first image display unit 120 became 60° at a position on the viewing side from the first image display unit 120. In this case, the polarization beam splitter 71 was provided such that the transmission axes of the wire grid polarizer 61 and the absorption polarizer 62 were in a direction not to transmit linearly polarized light emitted from the first image display unit 120, and the absorption polarizer 62 became the viewing side.

As the beam splitter 140, the polarization beam splitter 71 was provided such that the transmission axes of the wire grid polarizer 61 and the absorption polarizer 62 were in a direction of 45° to the transmission axis of the reflective polarizer 130 in a case of being viewed from the viewing side, and the glass plate 60 became the viewing side.

In this way, the image display system 82 of Example 2 was produced.

Example 3

Figure 23:
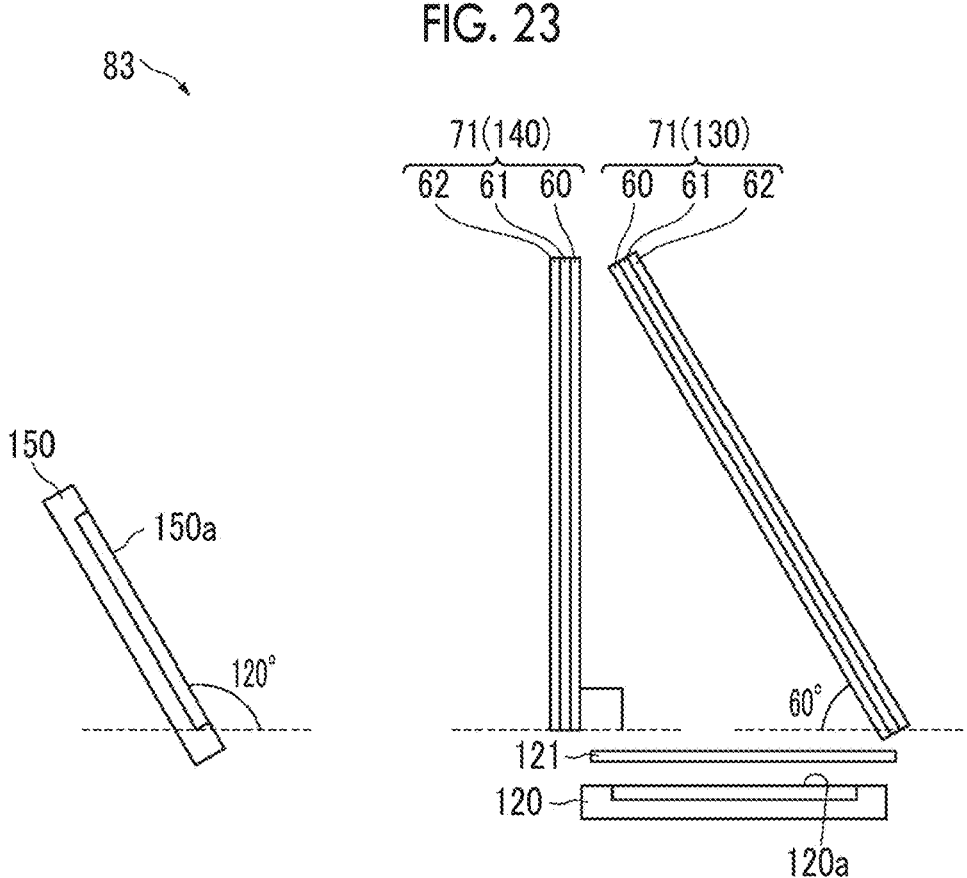
FIG. 23 is a schematic view showing an image display system of Example 3.

FIG. 23 shows the schematic configuration of an image display system 83 of Example 3.

In the image display system 82 of Example 2, the absorption polarizer 121 was provided on the image display surface 120a of the first image display unit 120 such that the transmission axis was in a direction to transmit linearly polarized light emitted from the first image display unit 120.

In this way, the image display system 83 of Example 3 was produced.

Example 4

Figure 24:
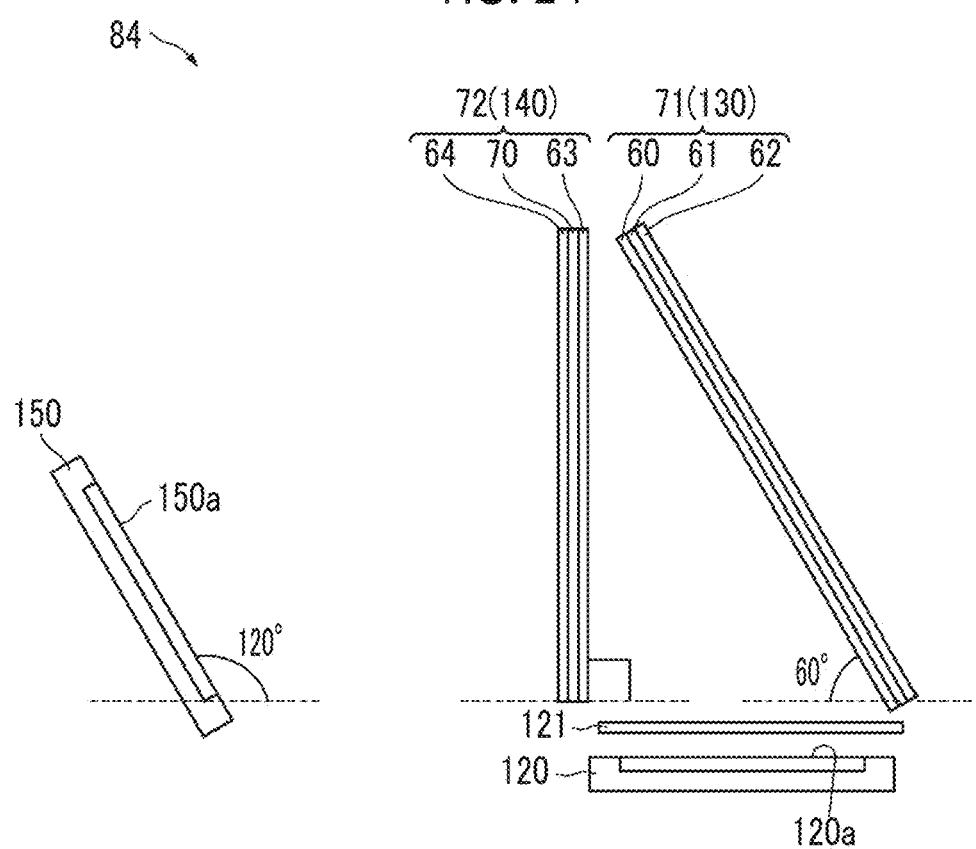
FIG. 24 is a schematic view showing an image display system of Example 4.

FIG. 24 shows the schematic configuration of an image display system 84 of Example 4.

In the image display system 83 of Example 3, the half mirror 72 with a quarter-wave retardation plate was used as the beam splitter 140, and was provided such that the slow axis of the quarter-wave retardation film 63 was in a direction of 45° to the transmission axis of the reflective polarizer 130 in a case of being viewed from the viewing side.

In this way, the image display system 84 of Example 4 was produced.

Example 5

Figure 25:
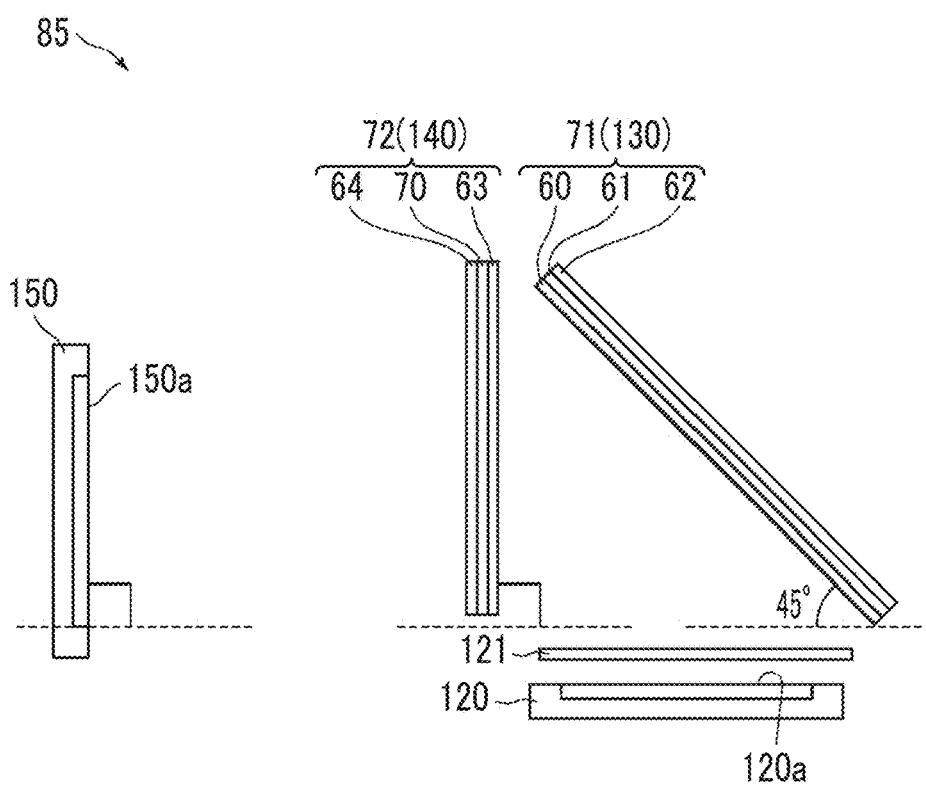
FIG. 25 is a schematic view showing an image display system of Example 5.

FIG. 25 shows the schematic configuration of an image display system 85 of Example 5.

The image display system 85 of Example 5 was produced in the same manner as in Example 4 except that the angle between the image display surface 120a of the first image display unit 120 and the reflective polarizer 130 became 45°, and the image display surface 150a of the second image display unit 50 was provided such that the angle to the image display surface 120a of the first image display unit 120 became 90°, compared to the image display system 84 of Example 4.

Example 6

Figure 26:
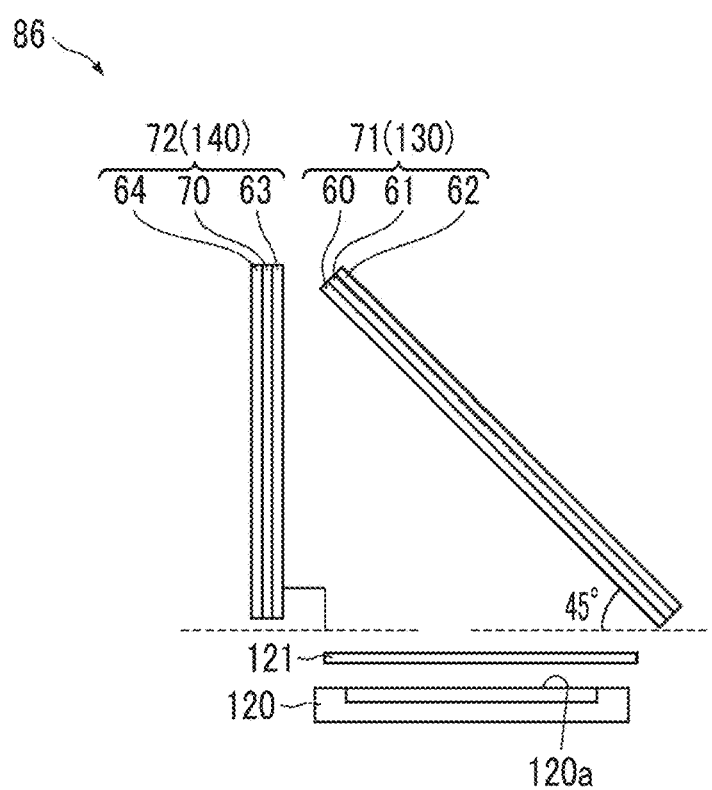
FIG. 26 is a schematic view showing an image display system of Example 6.

FIG. 26 shows the schematic configuration of an image display system 86 of Example 6.

The image display system 86 of Example 6 was produced in the same manner as in Example 5 except that the second image display unit 50 was not provided, compared to the image display system 85 of Example 5.

Comparative Example 1

Figure 27:
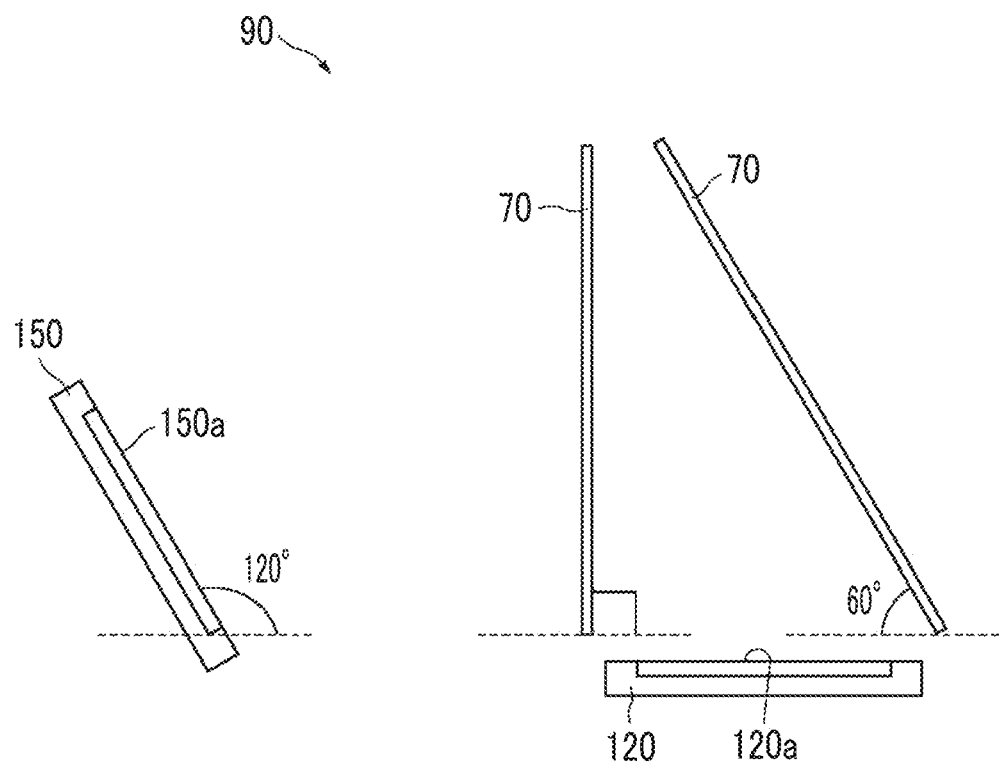
FIG. 27 is a schematic view showing an image display system of Example 7.

FIG. 27 shows the schematic configuration of an image display system 90 of Comparative Example 1.

A smartphone iPhone (Registered Trademark) 6sPlus manufactured by Apple Inc. was provided such that an image display surface turned upward, thereby obtaining the first image display unit 120. In iPhone (Registered Trademark) 6sPlus, emission light was elliptically polarized light, and was not linearly polarized light.

Next, the half mirror 70 was provided such that an angle to the image display surface 120a of the first image display unit 120 became 60° at a position on the viewing side from the first image display unit 120. In addition, another half mirror 70 was provided such that an angle to the image display surface 120a of the first image display unit 120 became 90° at a position on a side opposite to the viewing side from the first image display unit 120. A smartphone iPhone (Registered Trademark) 6sPlus manufactured by Apple Inc. was provided on a side opposite to the viewing side of the second half mirror 70 such that the angle between the image display surface 150a and the image display surface 120a of the first image display unit 120 became 120°, thereby obtaining the second image display unit 150.

In this way, the image display system 90 of Comparative Example 1 was produced.

Comparative Example 2

Figure 28:
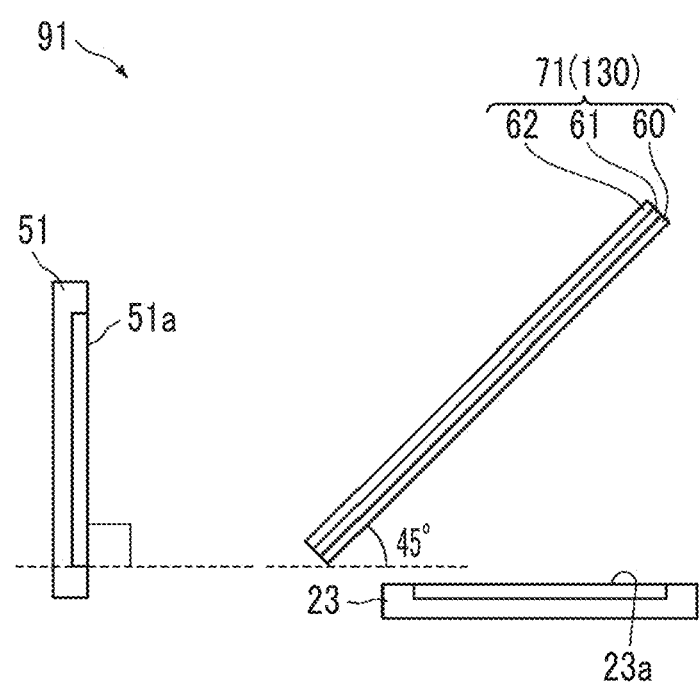
FIG. 28 is a schematic view showing an image display system of Comparative Example 1.

FIG. 28 shows the schematic configuration of an image display system 91 of Comparative Example 2.

A tablet terminal Kindle fire HDX manufactured by Amazon.com, Inc. was provided on a bottom surface such that a display surface 23a turned upward, thereby obtaining the first image display unit 23. Next, the polarization beam splitter 71 was provided such that an angle to the image display surface 23a became 45° at a position on a side opposite to the viewing side with respect to the first image display unit 23, thereby obtaining a beam splitter 33. In this case, the polarization beam splitter 71 was provided such that the transmission axes of the wire grid polarizer 61 and the absorption polarizer 62 were in a direction to reflect linearly polarized light emitted from the first image display unit 23, and the glass plate 60 became the viewing side. A tablet terminal Kindle fire HDX manufactured by Amazon.com, Inc. was provided on a side opposite to the viewing side of the beam splitter 33 such that an angle between an image display surface 51a and the image display surface 23a of the first image display unit 23 became 90°, thereby obtaining a second image display unit 51.

In this way, the image display system 91 of Comparative Example 2 was produced.

Comparative Example 3

Figure 29:
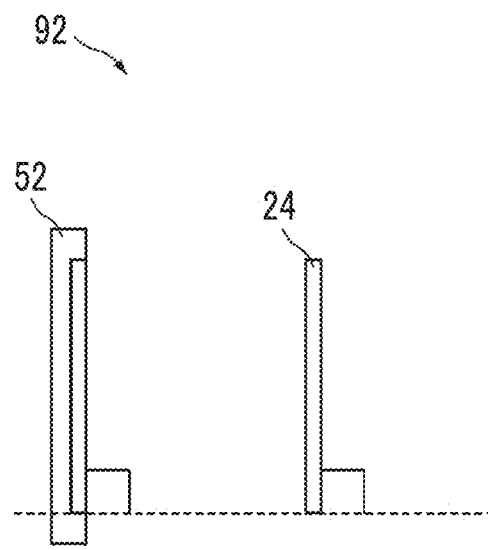
FIG. 29 is a schematic view showing an image display system of Comparative Example 2.
Figure 30:
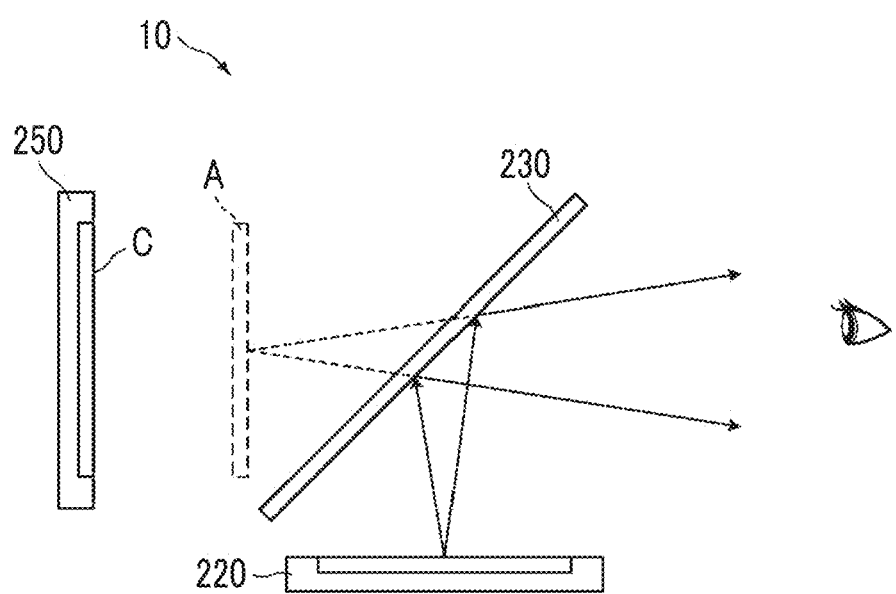
FIG. 30 is a schematic view of an image display system in the related art.

FIG. 29 shows the schematic configuration of an image display system 92 of Comparative Example 3.

A transmissive liquid crystal display device (product name: TSM-1020) manufactured by Innolux Corporation was provided vertically to a bottom surface, thereby obtaining a first image display unit 24. A tablet terminal Kindle fire HDX manufactured by Amazon.com, Inc. was provided vertically to the bottom surface on a side opposite to the viewing side of the first image display unit 24, thereby obtaining a second image display unit 52. In this way, the image display system 92 of Comparative Example 3 was produced.

<Evaluation of Image Evaluation System>
[Evaluation of Brightness of Virtual Image B or Direct Image D]

In the produced image display systems, the whole surface of the first image display unit was set to white display, the second image display unit was set to non-display, and the brightness of the virtual image B was measured using a spectroradiometer "SR-3" manufactured by Topcon Technohouse Corporation. In the image display system 92 of Comparative Example 3, brightness of a direct image D of the transmissive liquid crystal display device was measured. A result is shown in Table 1.

[Evaluation of Brightness of Transmission Image C]

In the produced image display systems, the first image display unit was set to non-display, the whole surface of the second image display unit was set to white display, and the brightness of the transmission image C was measured using a spectroradiometer "SR-3" manufactured by Topcon Technohouse Corporation. A result is shown in Table 1.

[Evaluation of Visibility of Direct Image of First Image Display Unit]

In the produced image display systems, the whole surface of the first image display unit was set to white display, the second image display unit was set to non-display, and visual evaluation regarding whether or not a display region and a non-display region of the first image display unit were directly viewed from the viewing side was performed. An evaluation criterion is as follows. A result is shown in Table 1.

<Evaluation Criterion>

A: Both of the display region and the non-display region of the first image display unit are not viewed.

B: The display region of the first image display unit is not viewed, and the non-display region is slightly viewed.

C: Both of the display region and the non-display region of the first image display unit are slightly viewed.

D: Both of the display region and the non-display region of the first image display unit are clearly viewed.

The principal configurations and the evaluation results of the examples of the comparative examples are shown in Table 1.

TABLE 1

|  |  | Example 1 | Example 2 | Example 3 | Example 4 | Example 5 | Example 6 |
|---|---|---|---|---|---|---|---|
| Number of Image Display System |  | 81 | 82 | 83 | 84 | 85 | 86 |
| First Image Display Unit | Type (Polarization State of Emission Light) | Liquid Crystal Display Device (Linearly Polarized Light) | Liquid Crystal Display Device (Linearly Polarized Light) | Liquid Crystal Display Device (Linearly Polarized Light) | Liquid Crystal Display Device (Linearly Polarized Light) | Liquid Crystal Display Device (Linearly Polarized Light) | Liquid Crystal Display Device (Linearly Polarized Light) |
| Polarizer 30 or 130 | Type | Absorption Polarizer | PBS 71 | PBS 71 | PBS 71 | PBS 71 | PBS 71 |
| Beam Splitter 40 or 140 | Type | Half Mirror 72 with Quarter-Wave Retardation Plate | PBS 71 | PBS 71 | Half Mirror 72 with Quarter-Wave Retardation Plate | Half Mirror 72 with Quarter-Wave Retardation Plate | Half Mirror 72 with Quarter-Wave Retardation Plate |
| Second Image Display Unit | Type (Polarization State of Emission Light) | Liquid Crystal Display Device (Linearly Polarized Light) | Liquid Crystal Display Device (Linearly Polarized Light) | Liquid Crystal Display Device (Linearly Polarized Light) | Liquid Crystal Display Device (Linearly Polarized Light) | Liquid Crystal Display Device (Linearly Polarized Light) | Absent |
| Presence or absence of Absorption Polarizer 21 |  | Present | Absent | Present | Present | Present | Present |
| Brightness of Virtual Image B or Direct Image D [cd/m$^2$] |  | 156 | 48 | 51 | 102 | 134 | 136 |
| Brightness of Transmission Image C [cd/m$^2$] |  | 165 | 69 | 75 | 168 | 146 | — |
| Visibility of Direct Image of First Image Display Unit |  | A | B | A | A | A | A |

|  |  | Comparative Example 1 | Comparative Example 2 | Comparative Example 3 |
|---|---|---|---|---|
| Number of Image Display System |  | 90 | 91 | 92 |
| First Image Display Unit | Type (Polarization State of Emission Light) | Liquid Crystal Display Device (Elliptically Polarized Light) | Liquid Crystal Display Device (Linearly Polarized Light) | Transmissive Liquid Crystal Display Device (Linearly Polarized Light) |
| First Optical Element | Type | Half Mirror 70 | PBS 71 | Absent |
| Second Optical Element | Type | Half Mirror 70 | Absent | Absent |
| Second Image Display Unit | Type (Polarization State of Emission Light) | Liquid Crystal Display Device (Elliptically Polarized Light) | Liquid Crystal Display Device (Linearly Polarized Light) | Liquid Crystal Display Device (Linearly Polarized Light) |

TABLE 1-continued

| | | | |
|---|---|---|---|
| Presence or absence of Absorption Polarizer 21 | Absent | Absent | Absent |
| Brightness of Virtual Image B or Direct Image D [cd/m$^2$] | 52 | 212 | 24 |
| Brightness of Transmission Image C [cd/m$^2$] | 78 | 246 | 36 |
| Visibility of Direct Image of First Image Display Unit | C | D | — |

In all of the image display systems 81 to 86 of the Examples 1 to 6, the virtual image B and the transmission image C were displayed with high brightness and had high visibility. Furthermore, in all of the image display systems 81 to 86 of the Examples 1 to 6, there was no need to provide a projection apparatus, such as a projector, and a display system with space saving was obtained.

In the image display system 81 of Example 1, the absorption polarizer was used on the most viewing side, the display of the first image display unit was not directly viewed. Furthermore, since the absorption polarizer was used, unnecessary specular reflection was suppressed, and a double image, ghost, or the like was not viewed.

In all of the image display systems 82 to 86 of Examples 2 to 6, the absorption polarizer 62 was provided on the viewing side of the reflective polarizer, whereby reflection of external light incident from the viewing side was significantly suppressed, and satisfactory visibility was achieved.

In the image display system 82 of Example 2, the image display device emitting linearly polarized light was used as the first image display unit, and the polarization beam splitter was used as the reflective polarizer, whereby the display of the first image display unit was not directly viewed.

In the image display system 83 of Example 3, the absorption polarizer 21 was further provided, whereby not only the display region of the first image display unit but also the non-display region was not directly viewed.

In the image display system 84 of Example 4 and the image display system 85 of Example 5, the half mirror with a quarter-wave retardation plate was used as the second beam splitter, whereby the brightness of the virtual image B and the transmission image C was particularly high, and satisfactory visibility was achieved.

In the image display system 86 of Example 6, the second image display unit was not provided, whereby the transmission image of the real object provided behind and the virtual image B were viewed in a superimposed manner, and a high stage effect was achieved.

EXPLANATION OF REFERENCES 10, 11, 12, 13: image display system
20, 23, 24: first image display unit
20a: first image display surface
21: absorption polarizer
30: absorption polarizer
30a: surface of absorption polarizer
40: beam splitter
40a: transflective surface
41, 43: quarter-wave retardation plate
42: half mirror
50, 51, 52: second image display unit
50a: second image display surface
55: real object
60: glass plate
61: wire grid polarizer
62: absorption polarizer
63, 64: quarter-wave retardation film
70: half mirror
71: polarization beam splitter
72: half mirror with quarter-wave retardation plate
73: absorption polarizer
81 to 86, 90 to 92: image display system
101 to 106, 201 to 204, 211 to 218: light beam
111, 112, 113: image display system
120: first image display unit
120a: first image display surface
121: absorption polarizer
130: reflective polarizer
130a: surface of reflective polarizer
131: absorption polarizer
140: beam splitter
140a: transflective surface
150: second image display unit
150a: second image display surface
155: real object
300: map image
301: additional image
302: superimposed image

What is claimed is:

1. An image display system comprising:
a first image display unit that has a first image display surface for displaying a first image and emits first emission light as first polarized light;
a beam splitter that has a transflective surface for transmitting a part of incident light and reflecting another part of the incident light, the transflective surface being arranged at a position where the first emission light emitted from the first image display unit is incident, and the beam splitter changing the polarized light of the first emission light and reflecting the first emission light; and
an absorption polarizer that is arranged at a position where reflected light reflected from the transflective surface of the beam splitter out of the first emission light is incident, to absorb the first polarized light and transmit second polarized light different from the first polarized light.

2. The image display system according to claim 1, wherein an angle $\alpha_1$ between the first image display surface of the first image display unit and the transflective surface of the beam splitter satisfies the following expression.

$$0°<\alpha_1<90°$$

3. The image display system according to claim 1, further comprising:
a second image display unit that has a second image display surface for displaying a second image and emits second emission light, wherein the second image display unit is arranged at a position where the second emission light is incident on the transflective surface of the beam splitter from a side opposite to a side on which the first emission light is incident, and at least a part of the second emission light is transmitted through the beam splitter and the absorption polarizer.

4. The image display system according to claim 3, wherein the second image display surface of the second image display unit is arranged at a position being viewed in a state superimposed with a virtual image to be formed at a position symmetrical to the first image display surface with respect to the transflective surface of the beam splitter.

5. The image display system according to claim 4, wherein the second image display surface of the second image display unit is positioned on a surface parallel to and different from the virtual image.

6. The image display system according to claim 3, wherein, in a case where an angle between the first image display surface of the first image display unit and the transflective surface of the beam splitter is $\alpha_1$, an angle between the first image display surface of the first image display unit and the second image display surface of the second image display unit is $2\alpha_1$.

7. The image display system according to claim 3, wherein the first image and the second image supplement information to each other.

8. The image display system according to claim 1, wherein the beam splitter includes a half mirror.

9. The image display system according to claim 8, wherein the beam splitter includes a polarization conversion element.

10. The image display system according to claim 9, wherein the polarization conversion element is a quarter-wave retardation plate.

11. An image display system comprising:
a first image display unit that has a first image display surface for displaying a first image and emits first emission light as first polarized light;
a reflective polarizer that is arranged at a position where the first emission light emitted from the first image display unit is incident, to reflect the first polarized light; and
a beam splitter that has a transflective surface for transmitting a part of incident light and reflecting another part of the incident light, the transflective surface being arranged at a position where the first emission light reflected from the reflective polarizer is incident, the beam splitter changing the polarized light of the first emission light and reflecting the first emission light,
wherein the reflective polarizer is arranged at a position where reflected light reflected from the reflective polarizer and further reflected from the beam splitter out of the first emission light is incident.

12. The image display system according to claim 11, wherein an angle $\alpha_2$ between the first image display surface of the first image display unit and the reflective polarizer satisfies the following expression, and $$0°<\alpha_2<90°$$

an angle $\beta_2$ between the first image display surface and the transflective surface satisfies the following expression.

$$85°<\beta_2<95°$$

13. The image display system according to claim 11, further comprising:
a second image display unit that has a second image display surface for displaying a second image and emits second emission light,
wherein the second image display unit is arranged at a position where the second emission light is incident on the transflective surface of the beam splitter from a side opposite to a side on which the reflective polarizer is arranged, and
at least a part of the second emission light is transmitted through the beam splitter and the reflective polarizer.

14. The image display system according to claim 13, wherein the second image display surface of the second image display unit is arranged at a position being viewed in a state superimposed with a virtual image of the first image display surface to be formed through the reflective polarizer and the transflective surface of the beam splitter.

15. The image display system according to claim 14, wherein the second image display surface of the second image display unit is positioned on a surface parallel to and different from the virtual image.

16. The image display system according to claim 13, wherein, in a case where an angle between the first image display surface of the first image display unit and the reflective polarizer is $\alpha_2$, an angle between the first image display surface of the first image display unit and the second image display surface of the second image display unit is $2\alpha_2$.

17. The image display system according to claim 13, wherein the first image and the second image supplement information to each other.

18. The image display system according to claim 11, further comprising:
an absorption polarizer that is arranged on a surface opposite to a surface, on which the first emission light is incident, of the reflective polarizer to absorb the first polarized light.

19. The image display system according to claim 11, wherein the beam splitter includes a half mirror.

20. The image display system according to claim 19, wherein the beam splitter includes a polarization conversion element.

21. The image display system according to claim 20, wherein the polarization conversion element is a quarter-wave retardation plate.

* * * * *